United States Patent
Edge et al.

(10) Patent No.: US 12,463,717 B2
(45) Date of Patent: Nov. 4, 2025

(54) SYSTEMS AND METHODS FOR SUPPORTING TRACKING AREAS FOR SATELLITE WIRELESS ACCESS

(71) Applicant: QUALCOMM Incorporated, San Diego, CA (US)

(72) Inventors: Stephen William Edge, Escondido, CA (US); Luis Fernando Brisson Lopes, Swindon (GB); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/705,197

(22) Filed: Mar. 25, 2022

(65) Prior Publication Data

US 2023/0052177 A1    Feb. 16, 2023

Related U.S. Application Data

(60) Provisional application No. 63/252,149, filed on Oct. 4, 2021, provisional application No. 63/231,239, filed on Aug. 9, 2021.

(30) Foreign Application Priority Data

Aug. 13, 2021 (GR) .............................. 20210100552
Oct. 18, 2021 (GR) .............................. 20210100709

(51) Int. Cl.
  *H04B 7/185* (2006.01)
  *H04W 48/04* (2009.01)
  (Continued)

(52) U.S. Cl.
  CPC ........ *H04B 7/18528* (2013.01); *H04W 48/04* (2013.01); *H04W 64/00* (2013.01); *H04W 84/06* (2013.01)

(58) Field of Classification Search
  CPC ....... H04W 8/08; H04W 72/04; H04W 48/10; H04W 60/00
  See application file for complete search history.

(56) References Cited

U.S. PATENT DOCUMENTS 10,684,350 B2 *  6/2020  Dupray ................ H04W 4/021
12,004,111 B2 *  6/2024  Shan .................... H04W 4/40
(Continued)

FOREIGN PATENT DOCUMENTS

WO        2021067803 A1   4/2021
WO   WO-2021092503 A1   5/2021

OTHER PUBLICATIONS

3GPP TS 23.401 version 15.4.0 Release 15 (Year: 2018).*
(Continued)

*Primary Examiner* — Khalid W Shaheed
(74) *Attorney, Agent, or Firm* — Thien T. Nguyen

(57) ABSTRACT

Techniques are described for supporting satellite wireless access for a user equipment (UE) using fixed tracking areas (TAs). TA identities (TAIs) are broadcast in a satellite radio cell by a base station indicating which TAs are covered by the radio cell. A UE can access a radio cell if at least one broadcast TAI is not forbidden for the UE. A base station provides the TAIs broadcast in a radio cell and a TAI for a TA in which a UE is located to a core network node to support access by the UE. The core network node uses the broadcast TAIs to decide whether UE access is allowed and uses the broadcast TAIs and the TAI to assign a UE registration area. The UE may transfer all the broadcast TAIs to a forbidden TAI list if UE access is rejected by the core network node.

22 Claims, 13 Drawing Sheets

(51) Int. Cl.
*H04W 64/00* (2009.01)
*H04W 84/06* (2009.01)

(56) References Cited

U.S. PATENT DOCUMENTS

| | | | | |
|---|---|---|---|---|
| 12,082,011 | B2* | 9/2024 | Määttänen | H04W 24/08 |
| 2011/0096731 | A1* | 4/2011 | Kamalaraj | H04W 48/18 |
| | | | | 370/329 |
| 2020/0100291 | A1* | 3/2020 | Ravishankar | H04W 74/0833 |
| 2020/0213000 | A1* | 7/2020 | Arur | H04B 7/1851 |
| 2021/0105693 | A1 | 4/2021 | Tripathi et al. | |
| 2022/0007267 | A1 | 1/2022 | Maattanen et al. | |
| 2022/0046578 | A1 | 2/2022 | Edge | |
| 2022/0132453 | A1* | 4/2022 | Wei | H04W 56/003 |

OTHER PUBLICATIONS

Ericsson: "TA handling for Moving Cells", SA WG2 Meeting #146E, S2-2105530, 3rd Generation Partnership Project (3GPP), Mobile Competence Centre, 650, Route Des Lucioles, F-06921 Sophia-Antipolis Cedex, France, vol. SA WG2, No. Elbonia, Aug. 16, 2021-Aug. 27, 2021, Aug. 10, 2021, XP052055746, 6 Pages, p. 3, paragraph 3.2.

International Search Report and Written Opinion—PCT/US2022/031785—ISA/EPO—Sep. 21, 2022.

Nokia., et al., "Analysis on Tracking Area Design," 3GPP Draft, 3GPP TSG-WG3 Meeting #104, R3-193191_WAS_R3-192802 TA REVTHALES2, 3rd Generation Partnership Project (3GPP), Mobile Competence Centre, 650, Route Des Lucioles, F-06921, Sophia-Antipolis Cedex, France, vol. RAN WG3, No. Reno, NV, USA; May 13, 2019-May 17, 2019, May 21, 2019 (May 21, 2019), XP051740754, 5 pages, the whole document, p. 3, paragraph 2.2.

Qualcomm Incorporated: "Discussion of Tracking Area Support with Hard and Soft TAC Update", S2-2106519, SA WG2 Meeting #146e, 3rd Generation Partnership Project (3GPP), Mobile Competence Centre, 650, Route Des Lucioles, F-06921 Sophia-Antipolis Cedex, France, vol. SA WG2, No. e-Meeting, Aug. 16, 2021-Aug. 27, 2021, Aug. 10, 2021, XP052054252, 9 Pages, p. 5, paragraph 4.

3GPP TS 38.413: "3rd Generation Partnership Project, Technical Specification Group Radio Access Network, NG-RAN, NG Application Protocol (NGAP) (Release 15)", 3GPP TS 38.413 V15.0.0, Jun. 2018, pp. 1-264.

* cited by examiner

SYSTEMS AND METHODS FOR SUPPORTING TRACKING AREAS FOR SATELLITE WIRELESS ACCESS

CLAIM OF PRIORITY UNDER 35 U.S.C. § 119

This application claims under 35 USC § 119 the benefit of and priority to U.S. Provisional Application No. 63/231,239, filed Aug. 9, 2021, entitled "SYSTEMS AND METHODS FOR TRACKING AREA SUPPORT WITH HARD AND SOFT TRACKING AREA UPDATE," Greek Application No. 20210100552, filed Aug. 13, 2021, entitled "SYSTEMS AND METHODS FOR TRACKING AREA SUPPORT WITH HARD AND SOFT TRACKING AREA UPDATE," U.S. Provisional Application No. 63/252,149, filed Oct. 4, 2021, entitled "SYSTEMS AND METHODS FOR TRACKING AREA SUPPORT WITH HARD AND SOFT TRACKING AREA UPDATE," Greek Application No. 20210100709, filed Oct. 18, 2021, entitled "SYSTEMS AND METHODS FOR TRACKING AREA SUPPORT WITH HARD AND SOFT TRACKING AREA UPDATE," all of which are assigned to the assignee hereof and are incorporated herein by reference in their entireties.

BACKGROUND

Field of the Disclosure

Various aspects described herein generally relate to wireless communication systems, and more particularly, to accessing a wireless network using communication satellites.

Description of Related Technology

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may each be otherwise known as a user equipment (UE).

Standardization is ongoing to combine satellite-based communication systems with terrestrial wireless communications systems, such as 5G New Radio (NR) networks. In such a system, a UE would access a satellite, also referred to as a space vehicle (SV), instead of a base station, which would connect to an earth station, also referred to as a ground station or non-terrestrial network (NTN) gateway, which in turn would connect to a 5G network (e.g., directly or via a base station). A 5G network could treat the satellite system as another type of Radio Access Technology (RAT) distinct from, but also similar to, terrestrial 5G NR.

Since satellites typically differ from terrestrial base stations in terms of the size of their coverage areas, movement of coverage areas, longer propagation delays and different carrier frequencies, a satellite RAT may need different implementation than a terrestrial RAT for supporting common services to end users. One example of a different implementation could be support of tracking areas across a network coverage area. It may then be preferable to both optimize, and to minimize the impact for, such a different implementation.

SUMMARY

Techniques are described for supporting satellite wireless access for a user equipment (UE) using fixed tracking areas (TAs). TA identities (TAIs) are broadcast in a satellite radio cell by a base station indicating which TAs are covered by the radio cell. A UE can access a radio cell if at least one broadcast TAI is not forbidden for the UE. A base station provides the TAIs broadcast in a radio cell and a TAI for a TA in which a UE is located to a core network node to support access by the UE. The core network node uses the broadcast TAIs to decide whether UE access is allowed and uses the broadcast TAIs and the TAI to assign a UE registration area. The UE may transfer all the broadcast TAIs to a forbidden TAI list if a UE access is rejected by the core network node.

In one implementation, a method is performed by a Radio Access Network (RAN) node for supporting satellite wireless access of a user equipment (UE) to a serving public land mobile network (PLMN), where the method includes broadcasting one or more tracking area (TA) identities (TAIs) in a satellite radio cell; receiving a non-access stratum (NAS) message from the UE, the NAS message sent by the UE in the satellite radio cell; determining a TA in which the UE is located; and sending the NAS message to a core network node and including with the NAS message a TAI for the TA in which the UE is located and the one or more TAIs broadcast in the satellite radio cell.

In one implementation, a Radio Access Network (RAN) node configured for supporting satellite wireless access of a user equipment (UE) to a serving public land mobile network (PLMN), includes an external interface configured to wirelessly communicate with network entities; at least one memory; and at least one processor coupled to the external interface, with the at least one memory and the at least one processor configured to: broadcast, via the external interface, one or more tracking area (TA) identities (TAIs) in a satellite radio cell; receive, via the external interface, a non-access stratum (NAS) message from the UE, the NAS message sent by the UE in the satellite radio cell; determine a TA in which the UE is located; and send, via the external interface, the NAS message to a core network node and including with the NAS message a TAI for the TA in which the UE is located and the one or more TAIs broadcast in the satellite radio cell.

In one implementation, a Radio Access Network (RAN) node configured for supporting satellite wireless access of a user equipment (UE) to a serving public land mobile network (PLMN), includes means for broadcasting one or more tracking area (TA) identities (TAIs) in a satellite radio cell; means for receiving a non-access stratum (NAS) message from the UE, the NAS message sent by the UE in the satellite radio cell; means for determining a TA in which the UE is located; and means for sending the NAS message to a core network node and including with the NAS message a TAI for the TA in which the UE is located and the one or more TAIs broadcast in the satellite radio cell.

In one implementation, a non-transitory storage medium includes program code stored thereon, where the program code is operable to configure at least one processor in a Radio Access Network (RAN) node for supporting satellite wireless access of a user equipment (UE) to a serving public land mobile network (PLMN), and where the program code comprises instructions to: broadcast one or more tracking area (TA) identities (TAIs) in a satellite radio cell; receive a non-access stratum (NAS) message from the UE, the NAS message sent by the UE in the satellite radio cell; determine a TA in which the UE is located; and send the NAS message to a core network node and including with the NAS message a TAI for the TA in which the UE is located and the one or more TAIs broadcast in the satellite radio cell.

In one implementation, a method is performed by a core network node for supporting satellite wireless access by a user equipment (UE) to a serving public land mobile network (PLMN), where the method includes receiving a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determining whether the UE is allowed to access the satellite radio cell based on the TAIs broadcast in the satellite radio cell by the RAN node; and sending a NAS accept message to the UE in response to a determination that the UE is allowed to access the satellite radio cell.

In one implementation, a core network node configured for supporting satellite wireless access by a user equipment (UE) to a serving public land mobile network (PLMN), includes an external interface configured to wirelessly communicate with network entities; at least one memory; and at least one processor coupled to the external interface, where the at least one memory and the at least one processor are configured to: receive, via the external interface, a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determine whether the UE is allowed to access the satellite radio cell based on the TAIs broadcast in the satellite radio cell by the RAN node; and send, via the external interface, a NAS accept message to the UE in response to a determination that the UE is allowed to access the satellite radio cell.

In one implementation, a core network node configured for supporting satellite wireless access by a user equipment (UE) to a serving public land mobile network (PLMN), includes means for receiving a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; means for determining whether the UE is allowed to access the satellite radio cell based on the TAIs broadcast in the satellite radio cell by the RAN node; and means for sending a NAS accept message to the UE in response to a determination that the UE is allowed to access the satellite radio cell.

In one implementation, a non-transitory storage medium includes program code stored thereon, where the program code is operable to configure at least one processor in a core network node for supporting satellite wireless access by a user equipment (UE) to a serving public land mobile network (PLMN), and where the program code comprises instructions to: receive a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determine whether the UE is allowed to access the satellite radio cell based on the TAIs broadcast in the satellite radio cell by the RAN node; and send a NAS accept message to the UE in response to a determination that the UE is allowed to access the satellite radio cell.

In one implementation, a method is performed by a user equipment (UE) for supporting satellite wireless access to a serving public land mobile network (PLMN), where the method includes receiving a plurality of tracking area (TA) identities (TAIs) broadcast in a satellite radio cell by a Radio Access Network (RAN) node; determining whether access to the satellite radio cell is allowed based on the plurality of TAIs; sending in the satellite radio cell a non-access stratum (NAS) request message to a core network node via the RAN node in response to a determination that access to the satellite radio cell is allowed; and receiving in the satellite radio cell a NAS response message from the core network node in the satellite radio cell via the RAN node.

In one implementation, a user equipment (UE) configured for supporting satellite wireless access to a serving public land mobile network (PLMN), includes a wireless transceiver configured to wirelessly communicate with network entities; at least one memory; and at least one processor coupled to the wireless transceiver, where the at least one memory and the at least one processor are configured to: receive, via the wireless transceiver, a plurality of tracking area (TA) identities (TAIs) broadcast in a satellite radio cell by a Radio Access Network (RAN) node; determine, via the wireless transceiver, whether access to the satellite radio cell is allowed based on the plurality of TAIs; send, via the wireless transceiver, a non-access stratum (NAS) request message in the satellite radio cell to a core network node via the RAN node in response to a determination that access to the satellite radio cell is allowed; and receive, via the wireless transceiver, a NAS response message in the satellite radio cell from the core network node via the RAN node.

In one implementation, a user equipment (UE) configured for supporting satellite wireless access to a serving public land mobile network (PLMN), includes means for receiving a plurality of tracking area (TA) identities (TAIs) broadcast in a satellite radio cell by a Radio Access Network (RAN) node; means for determining whether access to the satellite radio cell is allowed based on the plurality of TAIs; means for sending a non-access stratum (NAS) request message in the satellite radio cell to a core network node via the RAN node in response to a determination that access to the satellite radio cell is allowed; and means for receiving a NAS response message in the satellite radio cell from the core network node via the RAN node.

In one implementation, a non-transitory storage medium includes program code stored thereon, where the program code is operable to configure at least one processor in a user equipment (UE) for supporting satellite wireless access to a serving public land mobile network (PLMN), and where the program code comprises instructions to: receive a plurality of tracking area (TA) identities (TAIs) broadcast in a satellite radio cell by a Radio Access Network (RAN) node; determine whether access to the satellite radio cell is allowed based on the plurality of TAIs; send a non-access stratum (NAS) request message in the satellite radio cell to a core network node via the RAN node in response to a determination that access to the satellite radio cell is allowed; and receive a NAS response message in the satellite radio cell from the core network node via the RAN node.

Figure 1:
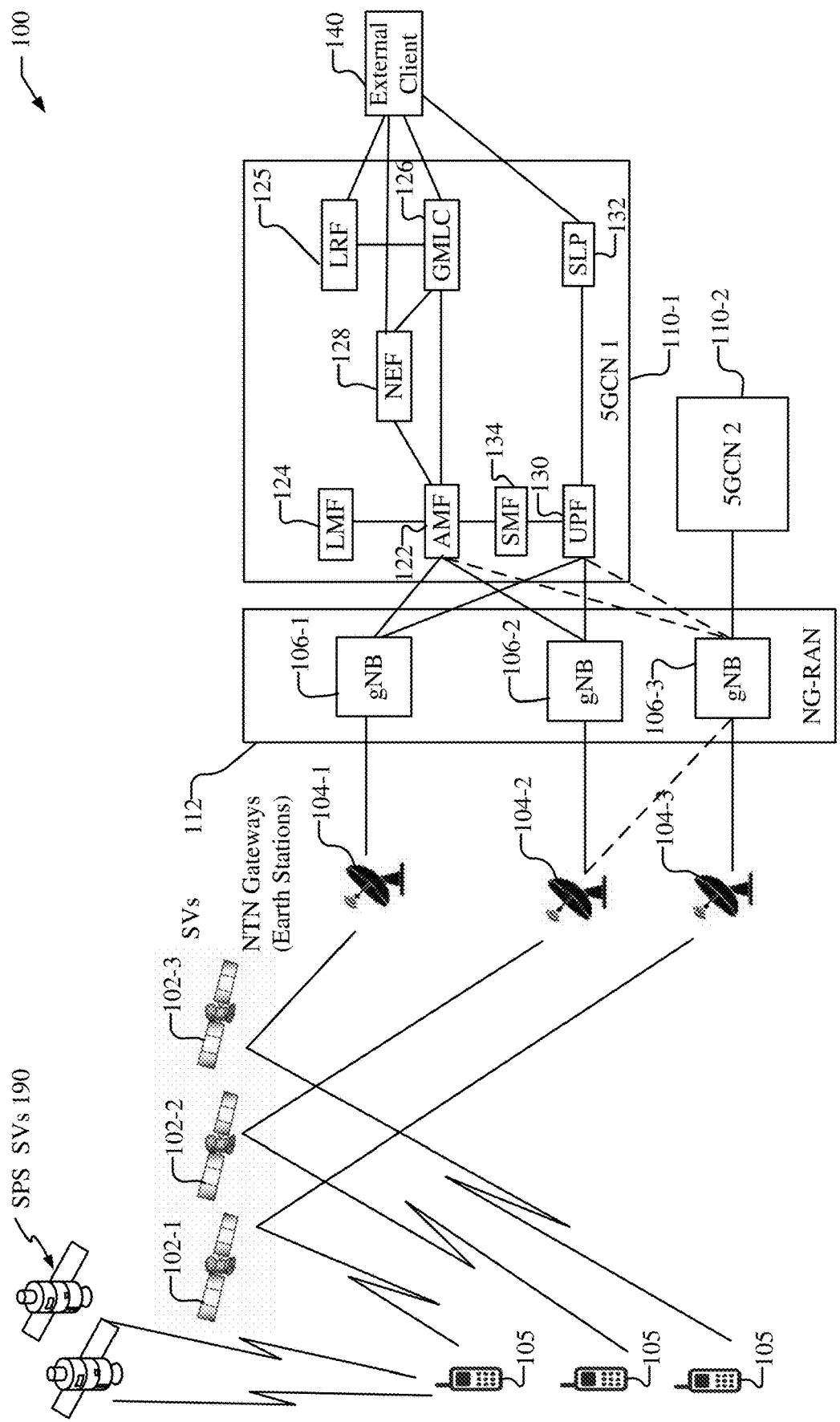
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a network such as a modified base station (without a terrestrial antenna) or a network node in a Core Network (CN). This element would in turn provide access to other elements in the network and ultimately to entities external to the network such as Internet web servers and other user devices.

A rationale for satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable emergency (e.g. E911) service, e.g., for a medical emergency or vehicle trouble in remote areas.

The use of satellite access may provide other benefits. For example, satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, satellite access may be used to overcome Internet blockage, e.g., in certain countries. Additionally, satellite access may provide diversification to Space Vehicle Operators (SVOs). For example, 5G NR satellite access could provide another revenue stream to SVOs who would otherwise provide fixed Internet access.

Terrestrial networks (TNs) using terrestrial cellular base stations can support relatively small fixed radio cells (e.g. 100 meters to 10 kms from one side to another) which can have accurately known geographic coverage areas. This allows an operator of a TN to subdivide their overall service area into fixed tracking areas (TAs) which are each composed of a number of fixed radio cells. Tracking areas allow an operator to control access by users (e.g. define certain geographic areas which can only be accessed by a subset of users) and to charge users based on their general location. Radio cells allow an operator a fine level of access control and fine level of charging discrimination and can be used for routing purposes and to support wireless emergency alerting (WEA). For example, a request to set up an emergency call sent by a UE to a TN can include the current serving radio cell of the UE which can be used by the TN to route the emergency call to a Public Safety Answering Point (PSAP), which serves the area of the serving radio cell. In addition, when a WEA message needs to be broadcast in a predefined target area to all UEs currently located in the target area, the TN may direct the WEA message to be broadcast only within radio cells whose coverage areas are within or partly within the target area.

Satellite access for UEs is being defined by the Third Generation Partnership Project (3GPP). A main objective in defining the satellite access is to minimize or avoid new impacts to a CN. One way to avoid or minimize impact to the CN is to retain support for fixed tracking areas (TAs). The fixed TAs could be defined geographically by Operations and Maintenance (O&M) with the geographic definitions being provided to base stations (e.g. eNBs and/or gNBs) and the CN. A base station may then determine the fixed TA in which a UE is located based on a current UE geographic location and may provide an identifier (ID) for this TA to a network node in the CN, e.g., an Access and Mobility Management Function (AMF), when a signaling connection is established for the UE. The network node may later use the fixed TA information to send a paging message to the UE via one or more base stations. Use of fixed TAs may have a benefit of reducing or minimizing new CN impacts.

FIG. 1 illustrates an example network architecture 100 capable of supporting satellite access using 5G New Radio (NR). FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The network architecture 100 comprises a number of UEs 105, a number of SVs 102-1 to 102-3 (collectively referred to herein as SVs 102), a number of Non-Terrestrial Network (NTN) gateways 104-1 to 104-3 (collectively referred to herein as NTN gateways 104) (sometimes referred to herein simply as gateways 104, earth stations 104, or ground stations 104), a number of NR NodeBs (gNBs) 106-1 to 106-3 (collectively referred to herein as gNBs 106) capable of communication with UEs via SVs 102 and that are part of a Next Generation (NG) Radio Access Network (RAN) (NG-RAN) 112. It is noted that the term gNB refers in general to an enhanced gNB with support for SVs and may be referred to as a gNB (e.g. in 3GPP) or sometimes may be referred to as a satellite NodeB (sNB). The network architecture 100 is illustrated as further including components of a number of Fifth Generation (5G) networks including 5G Core Networks (5GCNs) 110-1 and 110-2 (collectively referred to herein as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and other 5GCNs may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC).

The network architecture 100 may further utilize information from space vehicles (SVs) 190 for Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the network architecture 100 are described below. The network architecture 100 may include additional or alternative components.

Permitted connections in the network architecture 100 having the network architecture with transparent SVs illustrated in FIG. 1, allow a gNB 106 to access multiple Earth stations 104 and/or multiple SVs 102. A gNB 106, e.g., illustrated by gNB 106-3, may also be shared by multiple PLMNs (5GCNs 110), which may all be in the same country or possibly in different countries, and an Earth station 104, e.g., illustrated by Earth station 104-2, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the network architecture 100. Similarly, the network architecture 100 may include a larger (or smaller) number of SVs 190, SVs 102, earth stations 104, gNBs 106, NG-RAN 112, 5GCNs 110, external clients 140, and/or other components. The illustrated connections that connect the various components in the network architecture 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used to support satellite wireless access (e.g. using SVs 102) for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 140), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity, and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Observed Time Difference of Arrival (OTDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (Rx-Tx) and/or other positioning methods.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial base stations, e.g., gNBs (not shown) that are not capable of communication with UEs via SVs 102 (not shown). Pairs of terrestrial and/or satellite base stations, e.g., gNBs and gNB 106-1 in NG-RAN 112 may be connected to one another using terrestrial links—e.g. directly or indirectly via other gNBs or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B, also referred to as an ng-eNB. An ng-eNB may be connected to one or more gNBs 106 and/or gNBs in NG-RAN 112—e.g. directly or indirectly via other gNBs 106, gNBs and/or other ng-eNBs. An ng-eNB may provide LTE wireless access and/or evolved LTE (eLTE) wireless access to a UE 105.

A gNB 106 may be referred to by other names such as a gNB or a "satellite node" or "satellite access node." The gNBs 106 are not the same as terrestrial gNBs, but may be based on a terrestrial gNB with additional capability. For example, a gNB 106 may terminate the radio interface and associated radio interface protocols to UEs 105 and may transmit DL signals to UEs 105 and receive UL signals from UEs 105 via SVs 102 and earth stations (ESs) 104. A gNB 106 may also support signaling connections and voice and data bearers to UEs 105 and may support handover of UEs 105 between different radio cells for the same SV 102, between different SVs 102 and/or between different gNBs 106. In some systems, a gNB 106 may be referred to as a gNB or as an enhanced gNB. GNBs 106 may be configured to manage moving radio beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-3 communicating with earth stations 104-2 and 104-3.

The gNBs 106 may be separate from earth stations 104. The gNBs 106 alternatively may include or may be combined with one or more earth stations 104, e.g., using a split architecture. For example, with a split architecture, a gNB 106 may include a Central Unit and an earth station may act as Distributed Unit (DU). A gNB 106 may typically be fixed on the ground with transparent SV operation. In one implementation, one gNB 106 may be physically combined with, or physically connected to, one earth station 104 to reduce complexity and cost.

The earth stations 104 may be shared by more than one gNB 106 and may communicate with UE 105 via the SVs 102. An earth station 104 may be dedicated to just one SVO and to one associated constellation of SV 102 and hence may be owned and managed by the SVO. Earth stations 104 may be included within a gNB 106, e.g., as a gNB-DU within a gNB 106, which may occur when the same SVO or the same MNO owns both the gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 102 or radio cell to another Earth station 104.

As noted, while FIG. 1 depicts nodes configured to communicate according to 5G NR communication protocols for an NG-RAN 112, nodes configured to communicate according to other communication protocols may be used, such as, for example, an LTE protocol for an Evolved Universal Mobile Telecommunications System (UMTS) Terrestrial Radio Access Network (E-UTRAN), a Narrow Band Internet of Things (NB-IoT) protocol for an E-UTRAN supporting low bandwidth access using a variant of LTE, or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. The methods and techniques described herein for support of fixed TAs may be applicable to such other networks.

The gNBs 106 in the NG-RAN 112 may communicate with the AMF 122 in a 5GCN 110, which, for positioning functionality, may communicate with a Location Management Function (LMF) 124. For example, the gNBs 106 may provide an N2 interface to the AMF 122. An N2 interface between a gNB 106 and a 5GCN 110 may be the same as or similar to an N2 interface supported between a terrestrial gNB and a 5GCN 110 for terrestrial NR access by a UE 105 and may use the Next Generation Application Protocol (NGAP) defined in 3GPP Technical Specification (TS) 38.413 between a gNB 106 and the AMF 122. The AMF 122 may support mobility of the UE 105, including radio cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, OTDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102, SVs 190, gNBs and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124. A location response from the LMF 124 (e.g. containing a location estimate for the UE 105) may be similarly returned to the GMLC 126 via the AMF 122, and the GMLC 126 may then return the location response (e.g., containing the location estimate) to the external client 140. The GMLC 126 is shown connected to only the AMF 122 in FIG. 1 though in some implementations may be connected to both the AMF 122 and the LMF 124 and may support direct communication between the GMLC 126 and LMF 124 or indirect communication, e.g. via the AMF 122.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet. The UPF 130 may be connected to gNB s 106 and gNB s. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification, and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and in some implementations, the NEF 128. The external client 140 may optionally be connected to the core network 110 and/or to a location server, which may be, e.g., an SLP, that is external to 5GCN 110, via the Internet. The external client 140 may be connected to the UPF 130 directly (not shown in FIG. 1) or through the Internet. The external client 140 may be a server, a web server, or a user device, such as a personal computer, a UE, etc.

A Location Retrieval Function (LRF) 125 may be connected to the GMLC 126, as illustrated, and in some implementations, to the SLP 132, as defined in 3GPP Technical Specification (TS) 23.167. LRF 125 may perform the same or similar functions to GMLC 126, with respect to receiving and responding to a location request from an external client 140 that corresponds to a Public Safety Answering Point (PSAP) supporting an emergency call from UE 105. One or more of the GMLC 126, LRF 125, and SLP 132 may be connected to the external client 140, e.g., through another network, such as the Internet.

The AMF 122 may normally support network access and registration by UEs 105, mobility of UEs 105, including radio cell change and handover and may participate in supporting a signaling connection to a UE 105 and possibly data and voice bearers for a UE 105. The role of an AMF 122 may be to Register the UE during a Registration process, as discussed herein. The AMF 122 may page the UE 105, e.g., by sending a paging message via one or more radio cells in the tracking area in which the UE 105 is located.

Network architecture 100 may be associated with or have access to space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. UEs 105 may obtain location measurements for signals transmitted by SVs 190 and/or by base stations and access points such as eNBs, ng-eNB, gNB, and/or SVs 102 which may enable a UE 105 to determine a location estimate for UE 105 or to obtain a location estimate for UE 105 from a location server in 5GCN 110, e.g., LMF 124. For example, UE 105 may transfer location measurements to the location server to compute and return the location estimate. UEs 105 (or the LMF 124) may obtain a location estimate for UE 105 using position methods such as GPS, Assisted GPS (A-GPS), Assisted GNSS (A-GNSS), Observed Time Difference of Arrival (OTDOA), Enhanced Cell ID (ECID), multi-cell RTT, Wireless Local Area Network (WLAN) positioning (e.g. using signals transmitted by IEEE 802.11 WiFi access points), sensors (e.g. inertial sensors) in UE 105, or some (hybrid) combination of these. A UE 105 may use a location estimate for the UE 105 during Registration.

As noted, while the network architecture 100 is described in relation to 5G technology, the network architecture 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Figure 2:
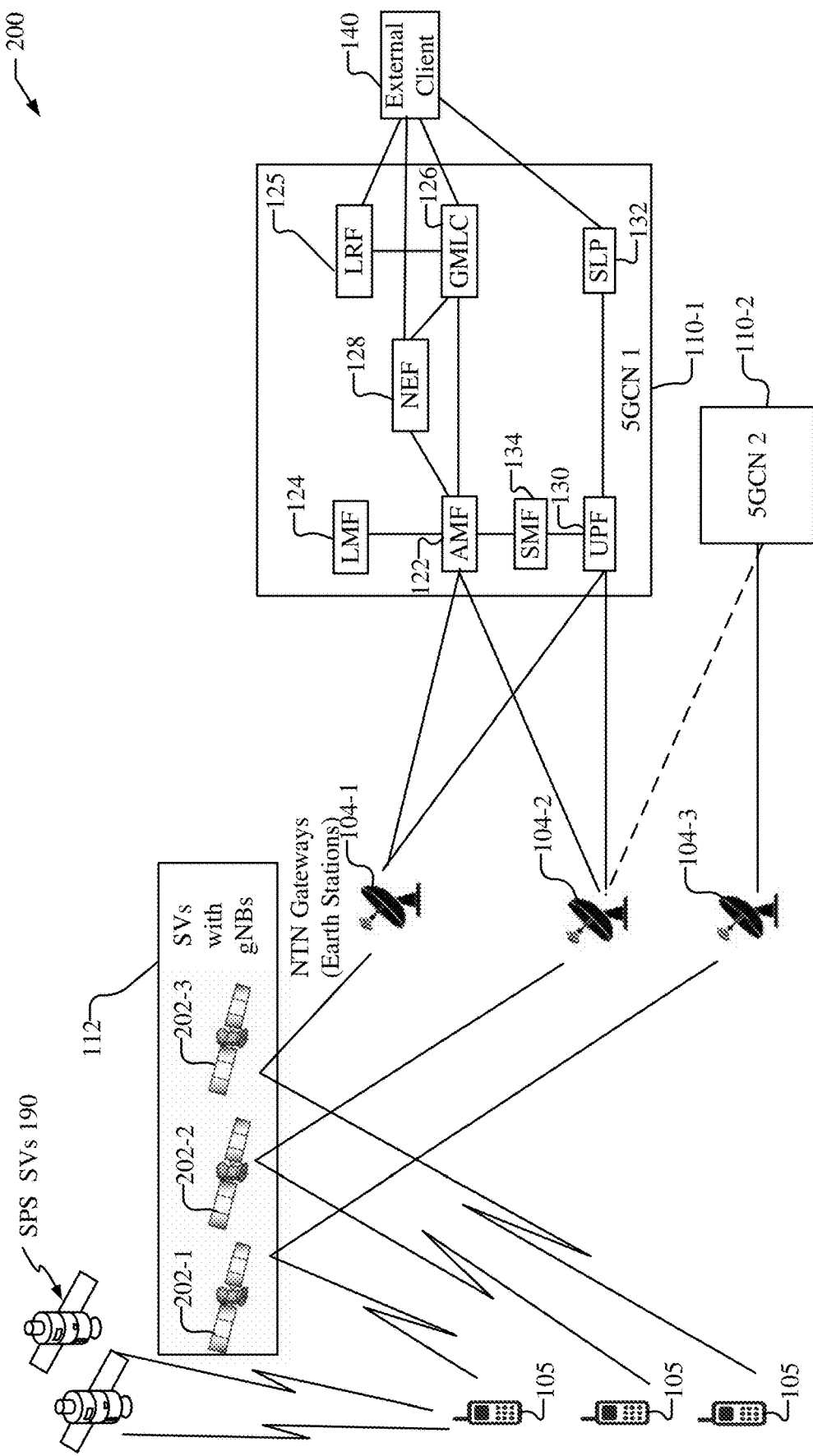
FIG. 2 shows a diagram of a communication system with a network architecture having regenerative SVs that is capable of supporting satellite access to a wireless network.

FIG. 2 shows a diagram of a network architecture 200 capable of supporting satellite access using 5G New Radio (NR) as discussed herein. The network architecture shown in FIG. 2 is similar to that shown in FIG. 1, like designated elements being similar or the same. FIG. 2, however, illustrates a network architecture with regenerative SVs 202-1, 202-2, and 202-3 (collectively SVs 202), as opposed to transparent SVs 102 shown in FIG. 1. A regenerative SV 202, unlike a transparent SV 102, includes an on-board gNB 202 (e.g. includes the functional capability of a gNB), and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform many of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different radio cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a terrestrial gNB. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving radio cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN1 110-1 and 5GNC2 110-2, and earth station 104-3 is connected to 5GCN2 110-2. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Figure 3:
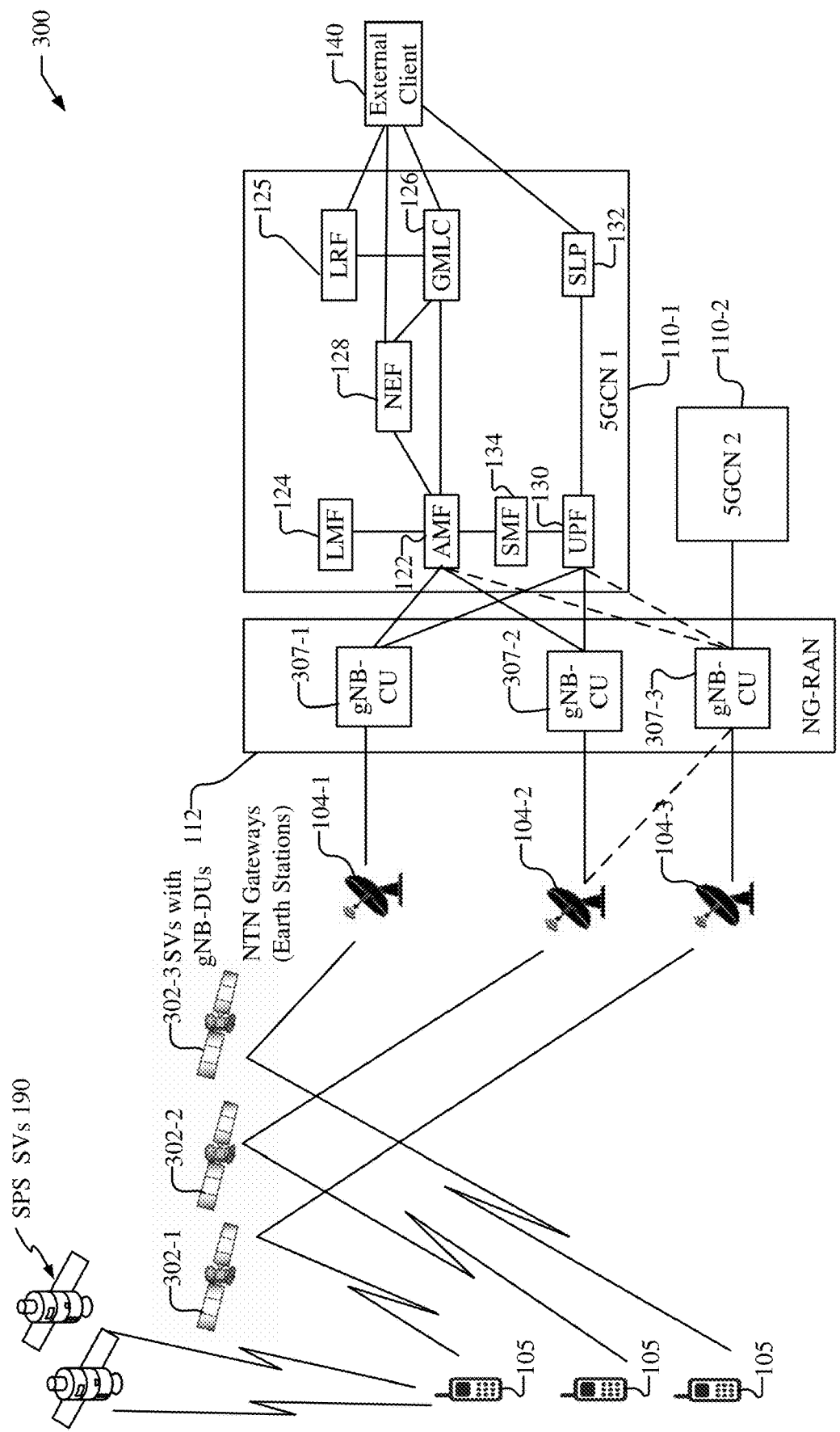
FIG. 3 shows a diagram of a communication system with a network architecture having regenerative SVs and a split satellite Node B (gNB) architecture that is capable of supporting satellite access to a wireless network.

FIG. 3 shows a diagram of a network architecture 300 capable of supporting satellite access using 5G New Radio (NR) as discussed herein. The network architecture shown in FIG. 3 is similar to that shown in FIGS. 1 and 2, like designated elements being similar or the same. FIG. 3, however, illustrates a network architecture with regenerative SVs 302-1, 302-2, and 302-3 (collectively referred to as SVs 302), as opposed to transparent SVs 102 shown in FIG. 1, and with a split architecture for the gNBs. The gNBs 307 include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a terrestrial gNB with a split architecture as described in 3GPP TS 38.401. Here a gNB-DU 302 corresponds to and performs functions similar to or the same as a terrestrial gNB Distributed Unit (gNB-DU) defined in TS 38.401, while a gNB-CU 307 corresponds to and performs functions similar to or the same as a terrestrial gNB Central Unit (gNB-CU) defined in TS 38.401. For example, a gNB-DU 302 and a gNB-CU 307 may communicate with one another using an F1 Application Protocol (FLAP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR radio cells for UEs 105. A gNB-CU 307 may support and terminate a Radio Resource Control (RRC) protocol, Packet Data Convergence Protocol (PDCP) and Service Data Protocol (SDAP) for the NR RF interface to UEs 105, as defined in 3GPP TSs 38.331, 38.323, and 37.324, respectively. A gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. A gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (FLAP) protocols, and (b) to support user plane data transfer for a UE 105 using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other terrestrial gNBs using terrestrial links to support an Xn interface between any pair of gNB-CUs 302 and/or between any gNB-CU 307 and any terrestrial gNB.

A gNB-DU 302 together with a gNB-CU 307 may: (i) support signaling connections and voice and data bearers to UEs 105; (ii) support handover of UEs 105 between different radio cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g. by interfacing to a 5GCN 110 in the same way or in a similar way to a gNB. The gNB-CUs 307 may further assist in sharing of SVs 302 over multiple countries.

In network architecture 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 110 impact at the expense of additional impact to a gNB-CU 307.

While supporting satellite access to a wireless network, an SV 102/202/302 may transmit radio beams (also referred to just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and gNBs 106/202/302/307 in one country may need to support UE 105 access from other countries. Sharing a beam over multiple countries may raise security issues for privacy of both data and voice. Further, sharing an SV beam over multiple countries may raise regulatory conflicts. For example, regulatory services including WEA, Lawful Interception (LI), and emergency (EM) calls in a first country may need support from gNBs 106/202/307 and earth stations 104 in a second country that shares the same SV beam.

Figure 4:
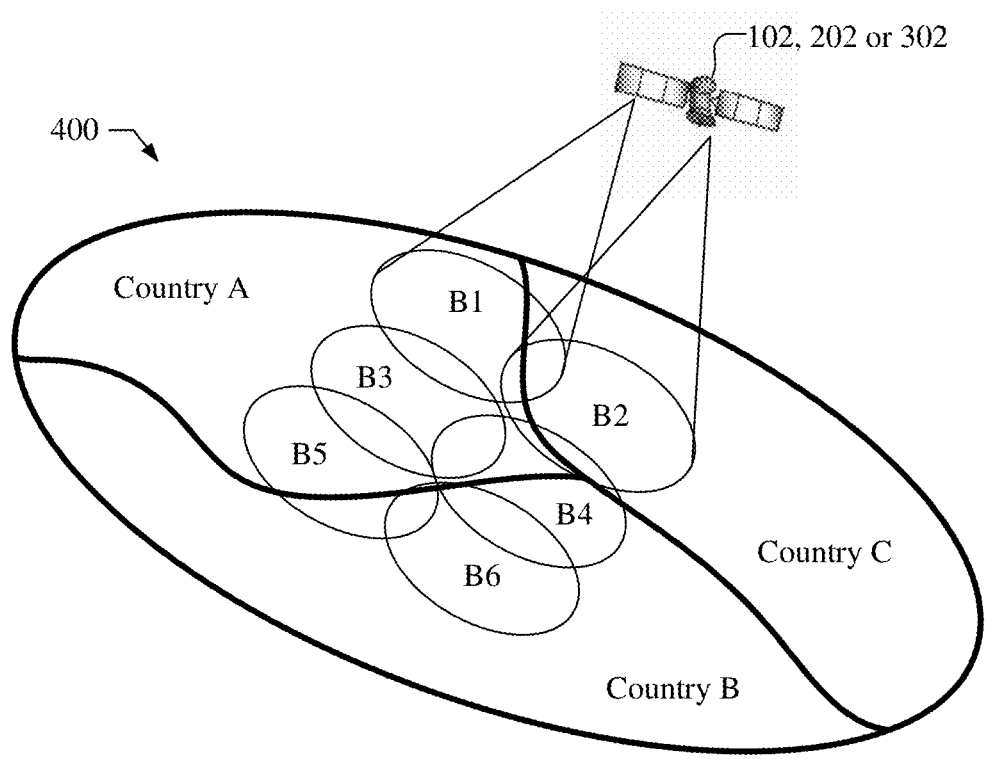
FIG. 4 illustrates an SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country, beams B1, B3, B5 could be assigned to country A, beams B4 and B6 could be assigned to country B, and beam B2 could be assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay. or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

Figure 5:
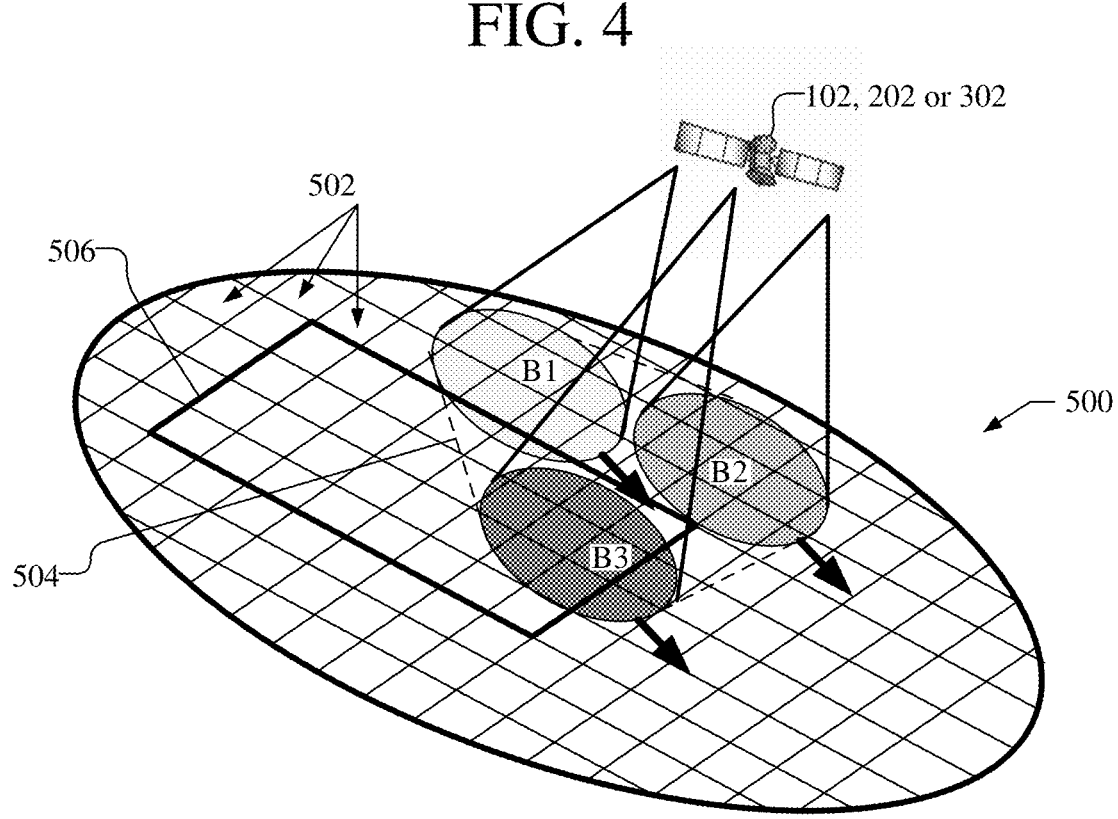
FIG. 5 illustrates radio cells produced by an SV over an area that includes a number of fixed cells.

FIG. 5 illustrates radio cells produced by an SV 102, 202, 302 over an area 500, where fixed cells 502 and fixed tracking areas 506 are used. A radio cell may comprise a single beam or multiple beams, e.g., all beams in a radio cell may use the same frequency or a radio cell may comprise one beam for each frequency in a set of different frequencies.

For example, beams B1, B2 and B3 may support three separate radio cells (one beam per radio cell) or may collectively support a single radio cell (e.g., radio cell 504 shown with dotted lines). Preferably, a radio cell covers a contiguous area.

Radio beams and radio cells produced by an SV 102, 202, 302 may not align with cells used by terrestrial wireless networks, e.g., 5GCN 110 terrestrial cells or LTE terrestrial cells. For example, in an urban area, a radio beam or radio cell produced by an SV 102, 202. 302 may overlap with many 5GCN terrestrial cells. When supporting satellite access to a wireless network, radio beams and radio cells produced by an SV 102, 202, 302 may be hidden from a 5GCN 110.

As illustrated in FIG. 5, the area 500 includes a number of Earth fixed cells 502, as well as fixed tracking areas (TAs) such as TA 506. Fixed cells are not "real cells," e.g., used for terrestrial NR and LTE access, and may be referred to as "virtual cells", "mapped cells", or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse, or a polygon. The coverage area is fixed relative to the surface of the Earth and does not change with time, unlike the coverage area of a radio cell which typically changes with time for a low Earth orbit (LEO) or medium Earth orbit (MEO) SV. A fixed cell 502 may be treated by a CN (e.g. a 5GCN 110) the same as a real cell that supports terrestrial access (e.g. using NR or LTE). Groups of fixed cells 502 may define a fixed TA 506, which may be treated by a CN (e.g. a 5GCN 110) the same as a TA that is defined for terrestrial access (e.g. using NR or LTE). Fixed cells and fixed TAs used for satellite wireless access may be used by a CN (e.g. a 5GCN 110) to support mobility management and regulatory services for UEs 105 with minimal new impact.

With regenerative SVs 202 with a non-split architecture as in network architectures 200, each radio cell may remain with the same SV 202 and may have a moving coverage area supporting different 5GCNs 110 at different times.

With transparent SVs 102 and regenerative SVs 302 for a split architecture as in network architectures 100 and 300, each radio cell may be assigned to and controlled by one gNB 106 or 307 on behalf of one or more PLMNs in one country. For a geostationary Earth orbit (GEO) SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent radio cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A radio cell for a first NGEO SV 102/302 may be transferred from a first gNB 106/307 to a second gNB 106/307 when (or after) moving into the fixed coverage area of the second gNB 106/307. Prior to this transfer, UEs 105 accessing the radio cell in a connected state may be moved to a new radio cell for the first gNB 106/307 or could be handed off to the second gNB 106/307 as part of transferring the radio cell. An SV 102/302 may be accessed from only one gNB 106/307 or from multiple gNBs 106/307, possibly in different countries. In one implementation, an SV 102/302 may be assigned to multiple gNBs 106/307 by partitioning radio cells produced by the SV 102/302 among the different gNBs 106/307. Radio cells may then be transferred to new gNBs 106/307 (and to new countries) as the SV 102/302 moves or as traffic demands change. Such an implementation could be a form of a soft handoff in which SV 102/302 transfer from one gNB 106/307 to another gNB 106/307 occurs in increments of radio cells and not all at once.

Figure 6:
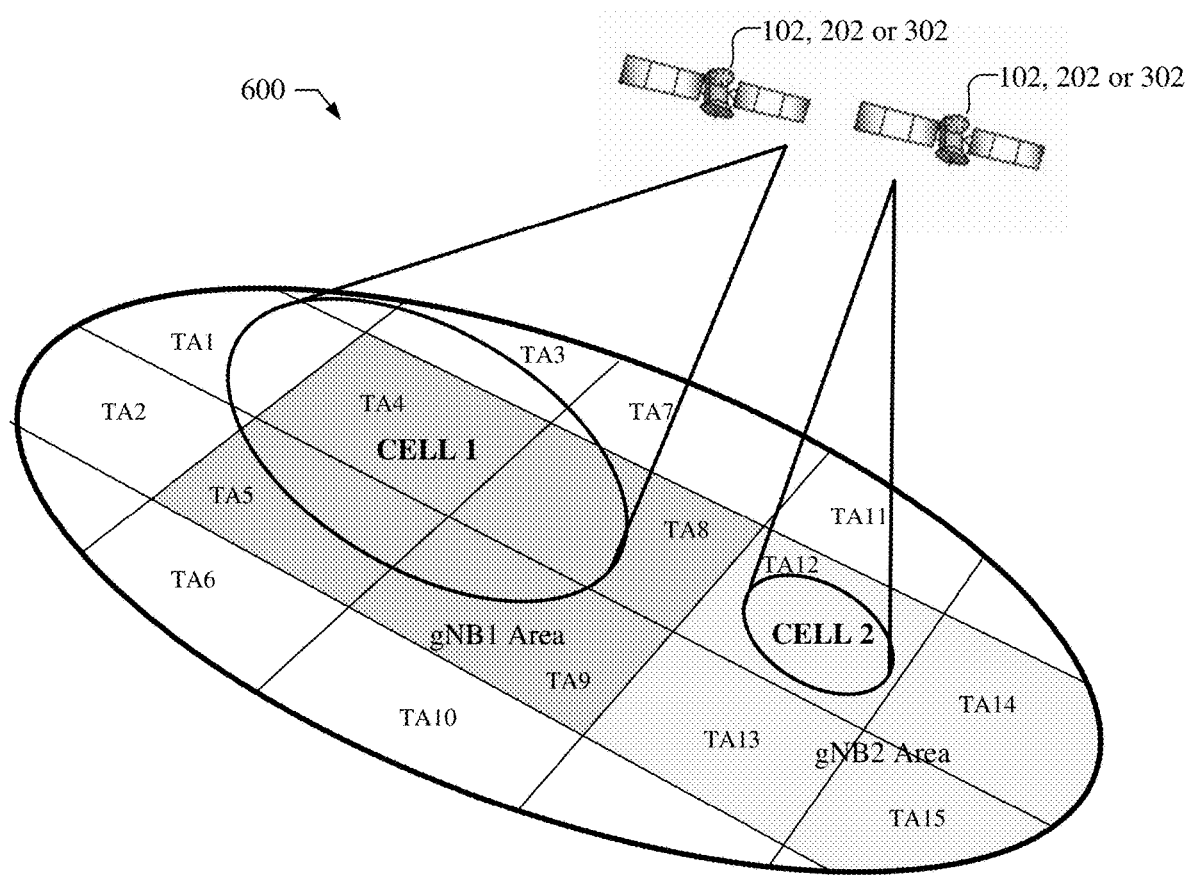
FIG. 6 illustrates an assignment of radio cells produced by an SV to fixed tracking areas (TAs).

FIG. 6 shows an example of assignment of radio cells, e.g., cell 1 and cell 2, produced by one or more SVs 102, 202, 302 over an area 600. As illustrated, the area 600 includes a number of fixed TAs, e.g., TA1-TA15, where TA4, TA5, TA8, and TA9 are assigned to a gNB1 (not shown and which may be a gNB 106, gNB 202 or a gNB 307), and TA12, TA13, TA14, and TA15 are assigned to a gNB2 (not shown and which may be another gNB 106, 202 or 307). In one implementation, a radio cell may be considered to support a fixed TA if the radio cell is wholly within the TA (e.g., Cell 2 within TA12); if the TA is wholly within the radio cell (e.g., TA4 within Cell 1); or if the overlap of the area of a radio cell and a TA exceeds a predetermined threshold fraction of the total area of the radio cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of a TA comprises a Tracking Area Code (TAC) or a Tracking Area Identity (TAI)). For an NGEO SV, the supported PLMNs and TAs may change as a radio cell coverage area changes. A gNB 106/202/307 may determine PLMN and TA support (and thus the PLMN IDs and TACs which are broadcast in a SIB for each radio cell) from known ephemeris data for each SV 102/202/302 and a known directionality and angular range for component radio beams for each radio cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TAIs or TACs for TA4 and possibly TA1, TA3, TA5, TA8 and/or TA9. Similarly, the SV 102/202/302 or another SV 102/202/302 may broadcast for Cell 2 a SIB that includes a TAC or TAI for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for conveyance to a UE 105, a gNB 106/202/307, or an entity in a 5GCN 110. A fixed TA area may be small enough to allow efficient paging by comprising an area supported by just a few radio cells (e.g. less than or equal to 5) and may also be large enough to avoid excessive UE registration (e.g. may extend at least 100 kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a city, county, state or small country, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one TA.

Fixed cells may be used by a wireless core network, such as a 5GCN 110, for support of regulatory services such as emergency (EM) call routing based on a current fixed serving cell for a UE 105, use of a fixed cell to approximate a UE 105 location, use of a fixed cell association to direct a Wireless Emergency Alerting (WEA) alert over a small defined area to a recipient UE 105, or use of a fixed cell as an approximate location or a trigger event for Lawful Interception (LI) for a UE 105. Such usage of fixed cells implies that fixed cells should be capable of being defined with a size and shape similar to that of cells that are defined and used for terrestrial wireless access, including allowing for very small (e.g., pico) cells and large (e.g., rural) cells.

With satellite wireless access, a UE 105 may determine a TA based on broadcast information, as well as from other sources. Moreover, a network may broadcast more than one TAC or TAI per PLMN in a radio cell. The broadcast of one TAC or one TAI per PLMN in a radio cell (e.g., in a System Information Block type 1 (SIB1)) may be referred to as a "hard TAC update or "hard TAI update" (e.g. since any change in the broadcast TAC or TAI would be total and thus "hard) and may align with support of TAC or TAI broadcast within a terrestrial network (TN). The broadcast of more than one TAC or TAI per PLMN in a radio cell may be referred to as a "soft TAC update" or "soft TAI update" (e.g. since not all broadcast TACs or TAIs need be changed at the same time and instead just one broadcast TAC or TAI or a subset of broadcast TACs or TAIs may be changed at the same time which may be seen as "soft"). Both hard TAC (or hard TAI) update and soft TAC (or soft TAI) update may be supported according to network operator preference.

It is noted that the terms TAC and TAI are sometimes used synonymously herein. In fact, a TAC is typically a single value (e.g. comprising 24 bits) indicating a TA in a known PLMN (e.g. where an MCC and MNC identifying the PLMN are known). A TAI typically comprises a mobile country code (MCC), a mobile network code (MNC) and a TAC and thereby indicates both a PLMN (via the MCC and MNC) and a TA in that PLMN (via the TAC). When TACs are broadcast in a radio cell, one or more PLMNs are also indicated for these TACs via MCC and MNC values that are also broadcast. The broadcast TACs then also indicate TAIs from association with the PLMNs (e.g. where a TAI is obtained by combining a broadcast TAC with the broadcast MCC and MNC for each PLMN indicated for the broadcast TAC). Thus a radio cell can effectively broadcast both TACs and TAIs. Since the TACs always point to TAIs, the term "broadcast TAI" is generally used herein, as it can be more precise.

Figure 7:
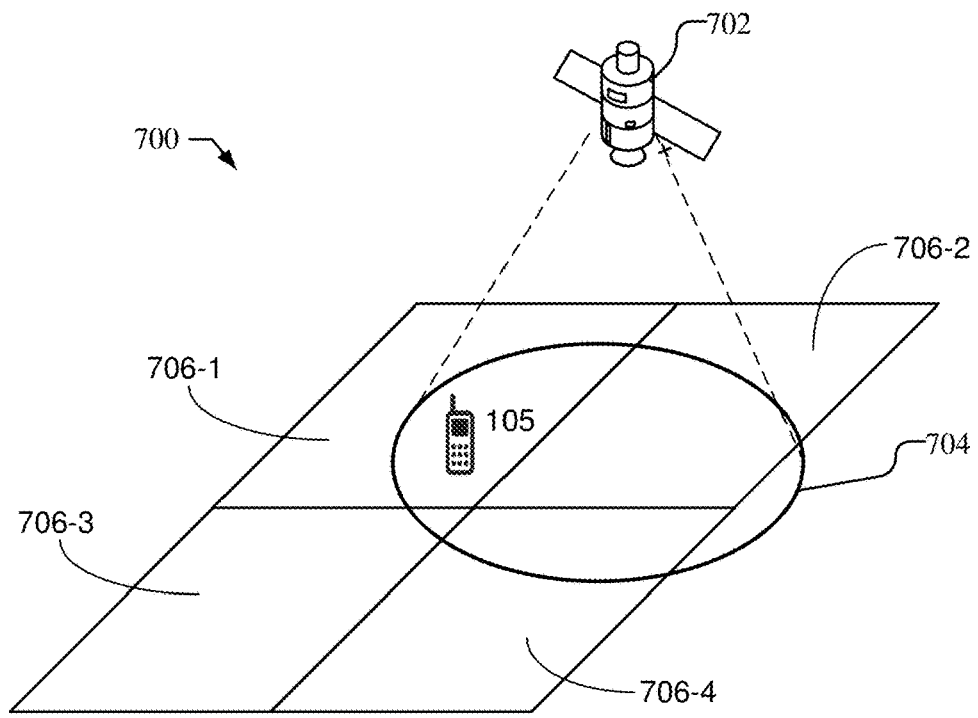
FIG. 7 illustrates an example of an environment including a radio cell that includes tracking areas covered by the radio cell.

FIG. 7, by way of example, illustrates an example environment 700 including an SV 702 (e.g. an SV 102, 202 or 302) with a radio cell 704 and a number of tracking areas 706 each having a fixed area covered at least partially by the radio cell 704. In the environment 700 illustrated in FIG. 7, TAIs for one or more of the tracking areas 706 may be broadcast by the SV 702 in the radio cell 704 (e.g. in a SIB1). If hard TAI update is used, the SV 702 would only broadcast a TAI for one of the four TAs 706-1, 706-2, 706-3 or 706-4. For example, a TAI for TA 706-2 might be broadcast since TA 706-2 has the greatest coverage by the radio cell 704. This would result in some distortion of the effective area of the broadcasted TAI (and the other TAIs not broadcast) since it would appear to UEs 105 within coverage of the radio cell 704 that one TA (e.g. TA 706-2) occupied the entire coverage area of the radio cell 704. If soft TAI update is used, TAIs for all four TAs 706-1, 706-2, 706-3 and 706-4 (or maybe just for TAs 706-1, 706-2 and 706-4) can be broadcast, which can avoid excluding any one TA 706 for a UE 105 that might be located in that TA 706. However, there may be another kind of distortion in that a UE 105 that is located in one of the TAs 706 (e.g. TA 706-1) could be allowed to access the radio cell 704 even if that TA is not in the current registration area (RA) for the UE 105 as long as at least one of the broadcast TAIs is part of the UE 105 RA.

When a single TAI is broadcast per PLMN in each physical radio cell (as for hard TAI update), there may need be no new impacts to a UE 105 or AMF 122 for accessing a physical radio cell, performing a Registration update or paging, but paging and/or Registration update overhead may be increased.

When multiple TAIs are broadcast per PLMN in a physical radio cell (as for soft TAI update) and to minimize new impacts to a UE 105, a simple solution can be that a UE 105 is allowed to access the radio cell without a mobility Registration Update as long as at least one of the broadcast TAIs belongs to a current UE 105 RA. If none of the broadcast TAIs belong to the current UE 105 RA, the UE 105 can be required to perform a Mobility Registration Update. This may reduce paging and/or Registration update overhead.

For terrestrial network access, a serving terrestrial gNB for a UE typically indicates, to a serving AMF for the UE, the serving radio cell for the UE (using a cell ID) and the tracking area (using a TAI) in which the UE is geographically located. The cell ID and TAI are typically included in a parameter (also referred to as information element (IE)) known as a User Location Information (ULI) IE. For example, a serving terrestrial gNB may provide an indication, to a serving AMF in a ULI IE, of a TA for a UE using a TAI, where a TAI may comprise a mobile country code (MCC), mobile network code (MNC) and a TAC. For example, when a UE with TN access initiates a NAS procedure with a 5GCN (e.g., for a non-access stratum (NAS) Service Request), the serving gNB may indicate the current TA in which the UE is located in the ULI provided to the 5GCN (e.g., an AMF) in certain NGAP messages (e.g. NGAP Initial UE message, NGAP Uplink NAS Transport, NGAP UE Context Release Complete, NGAP Handover Notify, NGAP Location Report), e.g., as discussed in 3GPP TS 38.413. The AMF may need to know the TAI in order to assign a registration area (RA) to the UE, where the RA comprises TAIs for TAs in which the UE is allowed to access the network without performing a Registration Update procedure. Similarly, a cell ID indicated in a ULI IE may be used by an AMF or other network elements to route an emergency call for the UE or assist with later paging of the UE. Provision of the same or similar information in a ULI IE for satellite wireless access for a UE 105 may be desirable to reduce new impacts to an AMF 122 and allow for efficient paging of a UE 105 and avoid excessive registration updates by a UE 105.

For NR satellite access, there are several possible alternatives for support of a TAI in the ULI IE passed by a gNB 106/202/307 to an AMF 122 in NGAP messages such as those listed above. For example, there can be multiple alternative options to support TAI selection for an NGAP ULI (e.g. in an NGAP Initial UE Message) when multiple TAIs are broadcast in a cell by a gNB 106/202/307 as described below. These alternatives are referred to herein as Option A, Option B, Option C, Option D and Option E.

Option A: A serving gNB 106/202/307 selects a TAI from TAIs broadcast for a serving PLMN in a serving radio cell for a UE 105 giving preference to any TAI for a TA in which the UE 105 is geographically located. This TAI is included in the ULI IE for the UE 105.

Option B: A UE 105 selects a TAI from TAIs broadcast in the serving radio cell for a serving PLMN and may give preference to a TAI in the registration area (RA) for the UE 105. The UE 105 may then indicate this TAI to a serving gNB 106/202/307 (e.g. in an RRC message) which can then include the TAI in a ULI IE.

Option C: A serving gNB 106/202/307 selects a TAI as the TAI for a TA belonging to the serving PLMN within which a UE 105 is geographically located.

Option D: A serving gNB 106/202/307 provides all TAIs broadcast in the serving radio cell for a serving PLMN as part of the ULI IE for a UE 105.

Option E: A serving gNB 106/202/307 selects a TAI as the TAI for a TA for the serving PLMN in which a UE 105 is geographically located if this TAI is broadcast in the serving radio cell. Otherwise, the serving gNB 106/202/307 selects a TAI broadcast in the serving cell for a TA for the serving PLMN that is geographically closest to the UE 105 location.

Figure 8:
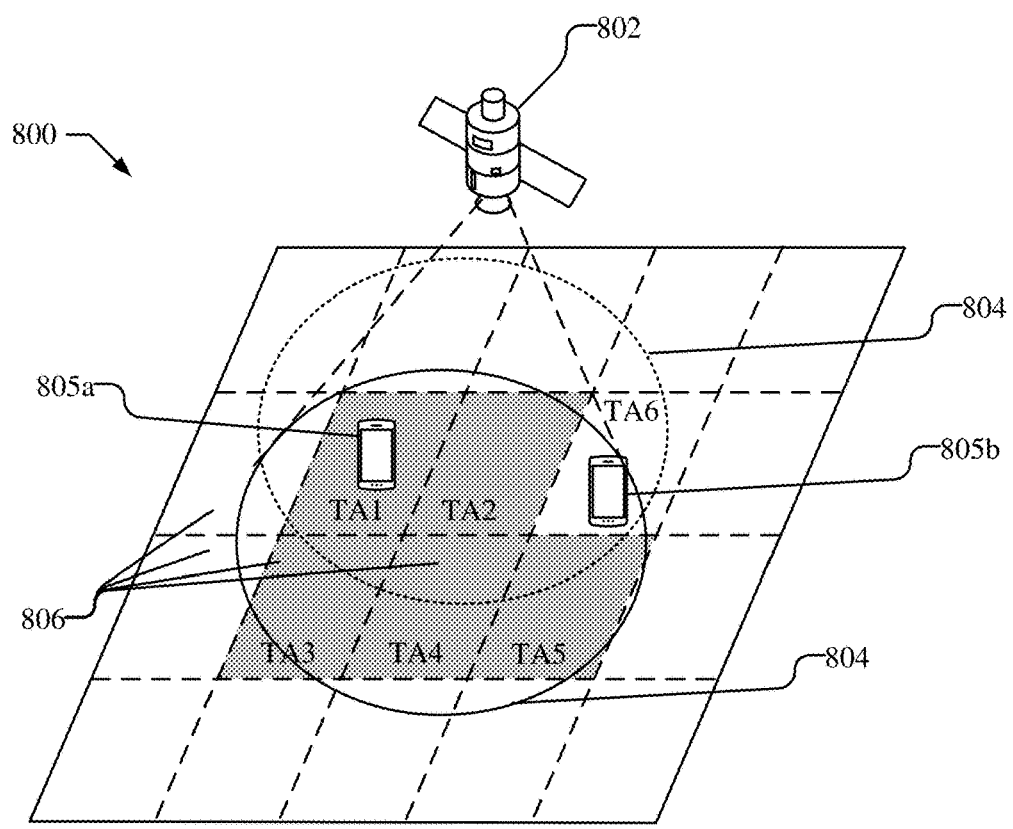
FIG. 8 illustrates an example of an environment including a radio cell including tracking areas covered by the radio cell, where the radio cell broadcasts tracking area identities (TAIs) of some of the tracking areas.

FIG. 8, by way of example, illustrates an example environment 800 including an SV 802 (e.g. an SV 102, 202, 302 or 702) that broadcasts a number of TACs (or TAIs) within a radio cell 804. The radio cell 804 is illustrated as having a coverage area at a time T (shown with a solid line) and a coverage area at time T+δ (shown with a dotted line) where δ may be small (e.g. a few minutes). The TACs or TAIs that are broadcast by the satellite 802 in the radio cell 804 at the time T are illustrated with shading, while tracking areas that are not broadcast by satellite 802 in the radio cell 804 at the time T are illustrated with no shading (white). Thus, the environment 800 illustrates a number of TAs 806, including TAs within the radio cell 804 at time T labeled TA1, TA2, TA3, TA4, TA5 and TA6, where TACs or TAIs for TA1, TA2, TA3, TA4, and TA5 are broadcast within the radio cell by the satellite 802 at time T, while a TAC or TAI for tracking area TA6 is not broadcast by the satellite 802 at time T. Environment 800 further illustrates a UE 805a located in TA1 and another UE 805b located in TA6 (e.g. where UEs 805a and 805b may be examples of a UE 105).

Examples of Options A-E are shown in Table 1 below for the UE 805a located in TA1 (for which a TAC or TAI is broadcast) and the UE 805b located in TA6 (for which, in this example, a TAC or TAI is not broadcast) and where (for Option E) the UE 805b is assumed to be closer to TA5 than to other TAs for which TACs or TAIs are broadcast. Table 1 shows (in the rightmost column) the TAs which would be indicated (by inclusion of TACs or TAIs) in a ULI IE for each UE shown in FIG. 8 and for each of the Options A to E.

TABLE 1

| UE and UE Location | Option | TA(s) indicated in ULI |
| --- | --- | --- |
| UE 805a in TA1 | A | TA1 |
|  | B | One of TAs 1 to 5 |
|  | C | TA1 |
|  | D | All of TAs 1 to 5 |

TABLE 1-continued

| UE and UE Location | Option | TA(s) indicated in ULI |
| --- | --- | --- |
|  | E | TA1 |
| UE 805b in TA6 | A | One of TAs 1 to 5 |
|  | B | One of TAs 1 to 5 |
|  | C | TA6 |
|  | D | All of TAs 1 to 5 |
|  | E | TA5 |

Options A to E above may be evaluated against several criteria as described below.

One criterion concerns how well each Option can assist an AMF to select a new Registration Area (RA) for a UE, or decide whether to retain an existing RA, when a UE performs an initial Registration or a Registration Update. For example, for TN access, an AMF should ensure that the TAI from the ULI is included in the RA (to allow the UE to access the current serving cell) and might also assign one or more other TAIs for nearby TAs to allow for some UE mobility without an additional Registration Update. For satellite access, some of the options can perform badly with respect to this criterion as shown below.

Option C can provide a TAI for a UE 105 in the ULI that is not broadcast in the serving radio cell (e.g. as illustrated by the example above for UE 805b in TA6) which could lead to an AMF 122 selecting an RA for the UE 105 that does include any TAI being broadcast. The UE 105 would then not be able to access the serving cell without performing another Registration Update which might lead to a sequence of Registration Updates or to the UE 105 looking for another radio cell.

Option B could provide a TAI for a UE 105 in the ULI for a TA that is distant from the actual UE 105 location (since the UE 105 typically does not know in which TA it is located or which TAs may be close to its location). For example, assume the UE 805a that is located in TA1 in FIG. 8 selects a TAI for TA5, which is delivered to an AMF 122 in the ULI and with the AMF 122 then including the TAI for TA5 but not other TAIs in the RA for the UE 805a. If the radio cell 804 moves to the area shown by the dashed circle in FIG. 8 at time T+δ, the UE 805a would still be in coverage of the radio cell but a TAC or TAI for TA5 would (probably) no longer be broadcast, resulting in a Registration Update from the UE 805a that could have been avoided if instead a TAC or TAI for TA1 or another TA closer to the UE 805a location had been provided to the AMF 122 in the ULI. Similar examples of unnecessary Registration Update can occur for Option B (for a UE located in TA1) for any other TAI provided in the ULI except a TAI for TA1.

Option A may perform just as poorly as Option B in some cases (e.g. for the UE 805b in TA6 in FIG. 8 for which a TAI is not broadcast) as a gNB 106/202/307 might include a TAI in the ULI for a TA which is also distant from the actual location of a UE (e.g. for the UE 805b). It could be argued that such cases should not happen if the selection of broadcast TAIs includes all covered TAs, but this cannot be guaranteed.

Option D may not provide a benefit over Option B since an AMF 122 would not know in which of the TAs indicated by provided TAIs in the ULI a UE 105 may be located or which TA(s) may be closest to the UE 105.

Option E provides a TAI which is both broadcast and is closest to a UE 105 location which could reduce the incidence of extra Registration Update for the UE 105 when a cell coverage area moves. A gNB 106/202/302 may determine a TA that is closest to the UE 105 location, e.g., based on a shortest distance between the UE 105 location and the perimeter of the TA, or based on a shortest distance between the UE 105 location and a center (or center of gravity) of the TA, etc. By way of example, for the UE 805*a* in TA1 in FIG. 8, Option E would provide an AMF 122 with a TAI for TA1 in the ULI, allowing the AMF 122 to include the TAI for TA1 in the RA for UE 805*a*. For the UE 805*b* in TA6, for which a TAI is not broadcast, the AMF 122 would receive a TAI for TA5 which is a TAI that is broadcast and is for the TA closest to the UE 805*b* location. This would lead to further Registration by UE 805*b* if the cell 804 were to move away from TA5 and cover TA6, but in that case the AMF 122 would receive a TAI for TA6 in the ULI and would then be able to include a TAI for TA6 in a new RA for UE 805*b*.

Another criterion can concern whether a TAI provided in a ULI is consistent with the currently assigned RA for a UE. For TN, the TAI provided in the ULI for a UE for any non-Registration NAS message should always be part of the current UE RA. Otherwise, the UE would have performed a Registration Update. For TN, the UE would also provide the last registered TAI in which it was located in a NAS Registration Request to an AMF (e.g. in the "Last visited registered TAI" defined in 3GPP TS 24.501) which should also be part of the current RA. For satellite access, there is a small risk that providing a TAI for a UE 105 for either of these purposes that is not part of the current UE 105 RA might trigger some anomalous behavior in an AMF 122 (e.g. an error condition). This can be avoidable because, for a satellite RAT, an AMF 122 can be programmed to ignore any difference between the TAI in the ULI or the TAI in a NAS Registration Request and the current RA for a UE 105. Additionally, the AMF 122 could perform a NAS Configuration Update to update the RA in the UE 105 with the TAI that was included in the ULI when this TAI was not part of the current RA. However, Option B can have the benefit of avoiding any new AMF 122 implementation by ensuring that the TAI provided in the ULI for a UE 105 to an AMF 122 is part of the UE 105 RA. All the other options may fall short in this regard.

The options also differ in terms of new impacts. Option B may have a new RRC signaling impact to enable a UE 105 to transfer a selected TAU to a serving gNB 106/202/307 for an RRC Connection setup and other instances of NAS message transfer. Option D may have a new NGAP impact to transfer all the TAIs broadcast in a radio cell to an AMF 122. Options A, C and E may have no new signaling impacts.

In terms of gNB complexity, Options B and D may be particularly simple as there is no need for a gNB 106/202/307 to map a current UE 105 location to a TA on which the UE 105 is located or a closest TA to the UE 105 location. Options A and C may require a gNB 106/202/307 capability to map a UE 105 location to a TA in which the UE 105 is located and Option E may additionally require a gNB 106/202/307 to map a UE 105 location to a closest TA to the UE 105 location and whose TAI is being broadcast when a TAI for the TA in which the UE 105 is located is not being broadcast. However, the mapping capability may not add much new complexity, since similar functionality may already be required (for all Options) when the gNB 106/202/307 decides which TAIs to broadcast in a given radio cell at a given time and when a gNB 106/202/307 maps a UE 105 location to a particular cell global identity (CGI) which can also be included in a ULI IE. For example, an operator (or an offline tool) could configure a fixed mapping from a CGI to an associated TAI (for a TA in which the cell for the CGI is located), thereby simplifying the UE location to TAI mapping for Options A and C via a mapping of UE location to CGI followed by a mapping from the CGI to the TAI. A similar mapping could be configured from a CGI to a sequence of TAIs for TAs that are at progressively increasing distances from the cell area defined by the CGI, thereby also supporting a mapping for Option E.

Another aspect of TAI selection may concern what happens when a gNB 106/202/307 does not have accurate enough UE 105 location information to determine a location related TAU for Options A, C and E. This could arise when a UE 105 transitions into a Connected state from an Idle state (e.g. during a UE 105 initial PLMN access) and does not include an approximate location in an RRC Message sent to the serving gNB 106/202/307 (e.g. because such a location may not be encrypted and may thus not be secure or reliable). When this scenario arises, the serving gNB 106/202/307 for the UE 105 can still provide in the ULI one of the TAIs being broadcast in a serving radio cell for the UE 105, though any location significance would then be lost. Options A, C and E could then behave more like Option B in terms of supporting RA assignment by an AMF 122 for a NAS Registration, so are not any worse. Another alternative would be for the serving gNB 106/202/307 to provide an indication in the ULI sent to the serving AMF 122 that the serving gNB 106/202/307 is unable to determine a TAI for the ULI due to insufficient UE 105 location information. For example, the indication could be encoded as a flag in the ULI or as a special reserved value (e.g. a binary all zeroes value or a binary all ones value) for a TAI in the ULI. The special reserved value for the TAI may be referred to as a "Null value", "Null TAC Value" or "Null TAI value" as it would not encode the value of a real TAC or real TAI.

A further aspect of TAI selection may concern paging efficiency. This can be related to how well the current RA for a UE 105 includes a TAI for the TA in which the UE 105 is actually located and TAIs for nearby TAs. If the RA includes TAIs for TAs distant from the UE 105 (e.g. because the serving AMF 122 was misled by receiving a ULI with a TAI for a TA distant from the UE 105 location), then when paging over the entire RA, paging may be included in cells that do not cover the actual UE 105 location. Such paging would be wasted because the UE 105 could not access these cells. As an example, assume the case of UE 805*a* located in TA1 in FIG. 8 and where the ULI for IE 805*a* includes a TAI for TA5 (e.g. as is possible with Option B or Option D as shown in Table 1). Then the RA for UE 805*a* may end up including the TAI for TA5. There could be one or more cells with coverage of TA5 that do not cover TA1 and any paging in these cells would be wasted. As already implied, this problem is more likely to arise for Options B and D where the reported TAA(s) is(are) not based on a real UE location and could sometimes arise for Option A when the TAI for the TA in which a UE is located is not currently broadcast. The problem may be further compounded if an AMF 122 assigns RAs comprising multiple TAIs in order to reduce unnecessary Registrations Updates.

Another criterion concerns whether the various Options can be used to select a TAI for the ULI in NGAP messages for a UE 105 that are not associated with NAS message transfer. These NGAP messages can include PDU Session Management messages, UE Context Management messages, UE Mobility Management messages and a Location Report message used for tracking a UE location. Options C and E and to a lesser extent Option A could be reused to select a TAI for the ULI IE in these non-NAS related NGAP messages because the TAI can always or generally be UE location related (e.g. and can thus be determined by a serving gNB 106/202/307 from a known or approximate UE location). If Option B or D is used for TAI selection in this case, the lack of location significance of these Options may cause problems. For example, an NGAP location reporting procedure can be used to track the location of a UE 105 in an area of interest which may be defined as a single TA or as a set of TAs. Option C and to a lesser extent Option E could support the NGAP location reporting procedure effectively because the ULI included in an NGAP Location Report message would include either the TAI for the TA in which the UE 105 is located (for Option C and sometimes Option E) or a TAI for a TA close to the UE 105 location (at other times for Option E). Using a UE 105 selected TAI to determine whether a UE 105 is located in the area of interest, as in Option B, would not be useful as the TAI selected by the UE 105 might not be location related. Furthermore, there could be significant extra impacts to reusing Option B as a gNB 106/202/307 would either need to obtain a TAI from the UE 105 (e.g. using RRC) or store and make use of a last UE 105 provided TAI (which, however, may not always be available when handover occurs). Therefore, for Options B and D, some different solution (e.g. different Option) might be needed to determine a TAI for location reporting and possibly for other non-NAS related NGAP messages.

Clearly no option is ideal, but Option E appears at least slightly better than the other options.

For Option E, and as discussed above, the inability to always provide a TAI that is part of the RA for a UE 105 may not be serious and the extra gNB 106/202/307 complexity can be reduced by extra configuration. Therefore, Option E appears suitable in principle for supporting TAI selection for an NGAP ULI IE.

In some implementations, the TAIs provided by an AMF 122 in a Registration Area (RA) for a UE 105 may be indicated to the UE 105 in an order of priority based on proximity of the corresponding TAs to the UE 105. For example, the AMF 122 may determine the proximity of each of the TAs indicated by the TAIs to the UE 105 location and generate an RA for the UE 105 that provides a list of the TAIs in order of the TAI for the TA closest to the current location of the UE 105 to the TAI for the TA farthest from the UE 105 location. In Option B, for example, the UE 105 may select the TAI from the RA with the highest priority (e.g., a first listed TAI for the TA closest to the UE 105) in the RA that is broadcast in the serving radio cell. In the example of FIG. 8 for UE 805b in TA6, for example, the RA may provide a list of TAIs with higher priority TAIs based on proximity including TAIs for TA6, TA5, TA2, TA4, TA1, and TA3 in that order. The UE 805b the selects the TAI with the highest priority (e.g., first listed TAC) in the RA and that is broadcast in the serving radio cell, which would be a TAI for TA5 in the present example (as a TAI for TA6 is not broadcast in the example in FIG. 8).

Similarly, e.g., in Option D, a gNB 106/202/307 may include in the ULI sent to AMF 122 all TAIs that are broadcast in a serving radio cell for a UE 105, but may provide a prioritized list of these TAIs based on proximity of the corresponding TAs to the location of the UE 105. Thus, the gNB 106/202/307 may determine the location of the UE 105 and generate the list of broadcast TAIs that is provided to the AMF 122 with TAIs for TAs closest to the current location of the UE 105 given higher priority (e.g. appearing earlier in a prioritized list) than TAIs for TAs that are farthest from the UE 105. In the example of FIG. 8 for UE 805b in TA6, the provided list of TAIs would then comprise TAIs for TA5, TA2, TA4, TA1, and TA3 in that order. The AMF 122 can use the prioritized list of TAIs provided by the gNB 106/202/307 for Option D to determine or help determine a prioritized list of TAIs for a UE 105 RA as described above.

In some implementations, two or more options from Options A to E above may be merged or combined to reduce or eliminate some of the previous disadvantages. The mergers are referred to using the options they include (e.g. where Option B+C means Option B combined with Option C).

In one Option B+E, for transfer of NAS messages other than a NAS Registration, the UE 105 selects a TAI from the RA as for Option B and sends this TAI to the gNB 106/202/307 using RRC. The gNB 106/202/307 then includes this TAI in the ULI. For transfer of a NAS Registration Request, the UE 105 does not include a TAI. Based on non-inclusion of a TAI, The gNB 106/202/307 then selects a TAI for the ULI as for Option E. For other instances of a ULI, the gNB 106/202/307 may select a TAI as for Option E.

In another Option B+C+D, for transfer of NAS messages other than a NAS Registration, the UE 105 selects a TAI from the RA as for Option B and sends this TAI to the gNB 106/202/307 using RRC. The gNB 106/202/307 then includes this TAI in the ULI sent to the AMF 122. For transfer of a NAS Registration Request, the UE 105 does not include a TAI. Based on non-inclusion of a TAI, the gNB 106/202/307 then selects a TAI as for Option C and includes this TAI in the ULI and further includes in the ULI all TAIs broadcast in the serving cell as for Option D. For other instances of a ULI, the gNB 106/202/307 selects a TAI as for Option C.

In a further Option C+D, the gNB 106/202/307 selects a TAI as for Option C and includes this TAI in the ULI and further includes in the ULI all TAIs broadcast in the serving cell as for Option D.

With each of Options B+E, B+C+D and C+D, a gNB 106/202/307 may include an indication (e.g. a Null TAC value or Null TAI value) in the ULI for a UE 105 when the gNB 106/202/307 has no location information or insufficient location information for the UE 105 to determine a TA in which the UE 105 is located (for Option C or Option E) or that may be closed to the UE 105 location (for Option E). With Option C+D or Option B+C+D, the gNB 106/202/307 may then include this indication in the ULI sent to the AMF 122 and may further indicate in the ULI all of the TAIs that are broadcast by the SV 802 in the radio cell for the UE 105. The AMF 122 may thereby still know which TAs may be nearby to the UE 105 which may help the AMF 122 determine an RA for the UE 105 even though the AMF 122 may not know in which TA the UE 105 is located. The provision of the indication (e.g. a Null TAC value or Null TAI Value) by the gNB 106/202/307 can also be used when location information for a UE 105 may be available but when the gNB 106/202/307 is not implemented or not configured to support mapping of UE 105 location information (e.g. a location estimate for UE 105) to a TA in which the UE 105 is located. Such provision of the indication (e.g. a Null TAC value or Null TAI value) may assist implementation by not requiring that all gNBs 106/202/307 necessarily support mapping of UE 105 location information into a TA closest to the UE 105 or a TA in which a UE 105 may be located. In such cases and for Options B+C+D and C+D, a gNB 106/202/307 can still provide an indication of all the TAIs that are broadcast in a serving radio cell for a UE 105 which may still assist the AMF 122 with RA determination for the UE 105.

Option B+E may have an RRC impact and higher gNB 106/202/307 complexity but otherwise may perform as well as or better than Option E.

Option B+C+D could potentially perform better than Option E and Option B+E with regard to supporting effective RA assignment for a UE 105 by an AMF 122 and Paging efficiency for a UE 105 because it provides the AMF 122 with both (i) the TA in which the UE 105 is located even when the corresponding TAI for this TA is not broadcast, and (ii) all the TAIs being broadcast. For each TA in which a UE 105 may be located, an AMF 122 can then be configured with a list of other TAs in order of distance from this TA. An AMF 122 could then select a TAI or a set of TAIs for the RA that were both being broadcast and whose corresponding TAs are close to or include the TA in which the UE 105 is located, which might enable a better RA assignment for the UE 105 by the AMF 122. However, Option B+C+D may have higher gNB 106/202/307 impact and highest signaling impact with both RRC and NGAP impacts.

Option C+D may perform as well as Option B+C+D but with reduced impact (due to no RRC impact to support Option B) and with TAIs included in the ULI not always necessarily being part of the UE 105 RA.

Support for Service Areas and Forbidden Areas may be omitted for satellite access. However, this would mean that an operator who assigns allowed and non-allowed areas to UEs for terrestrial network (TN) access would be unable to do this for satellite access. That could lead to some anomalous behavior. For example, a UE may move into a forbidden TN area and then periodically (e.g. whenever outdoors) obtain satellite access and service, thereby circumventing the restriction on TN service. This could lead to changes of user behavior—e.g. the user evades TN restrictions by going outdoors (or near a window when indoors) for services supported by satellite access—which could degrade the value of TN restrictions by confining them to services only available using TN (e.g. such as high speed data).

This suggests that even an approximate form of service area control could be useful for satellite access. The level of control may not be precise but might still be useful to approximate TN restrictions. The following rules, referred to as rules 1, 2, 3 and 4, may be used to support service areas and forbidden areas.

With a rule 1, UE 105 access to a satellite radio cell can be allowed if at least one broadcast TAI is not in a non-allowed TAI list or forbidden TAI list for the UE 105. For example, the at least one broadcast TAI can be part of a current RA for the UE 105 and/or part of an allowed TAI list for the UE 105. Otherwise, the UE 105 follows the existing TN rules for a forbidden TAI if all broadcast TAIs in the radio cell are forbidden TAIs, or follows the rules for a non-allowed TAI otherwise which may allow a UE 105 to at least send a NAS Registration Request.

As a compliment to rule 1, and in a rule 2, an AMF 122 can allow a UE 105 access to a radio cell if at least one broadcast TAI for the radio cell is not in a non-allowed or forbidden list for the UE 105. An AMF 122 can then accept a request for a NAS procedure by the UE 105 (e.g. a NAS Registration Request or a NAS Service Request). If, however, all TAIs broadcast in the radio cell are part of a forbidden TAI list for the UE 105, an AMF 122 can reject a request for a NAS procedure by the UE 105 (e.g. a NAS Registration Request or a NAS Service Request) by a sending a NAS Reject message (e.g. a NAS Registration Reject or a NAS Service Reject) and include a cause indicating that the broadcast TAIs are forbidden for the UE 105. Otherwise, if one or more of the broadcast TAIs are non-allowed but not forbidden for the UE 105, the AMF 122 can allow and accept a NAS Registration Request but reject other NAS messages like a NAS Service Request. The AMF 122 can know which TAIs are broadcast in the radio cell if Option D, Option C+D or Option B+C+D, as described above, are supported. Rules 1 and 2 can also be applied to hard TAI update when only one TAI is broadcast in a radio cell, where a reference to "all TAIs broadcast in the radio cell" above is replaced by "the one TAI broadcast in the radio cell".

With a rule 3, for a UE 105 receiving a NAS Reject message, if the Reject indicates the current TAI is forbidden (e.g. as described above for rule 2), the UE 105 treats all broadcast TAIs for the current serving radio cell that are not in the current RA and not in an allowed TAI list as forbidden TAIs.

With a rule 4, the UE 105 updates the Forbidden TAI List for the UE 105 by removing a TAI from the forbidden TAI list if the TAI is received as part of a new RA for the UE 105 (e.g. in a Registration Request received from an AMF 122) or if the TAI is received as an allowed TAI (from an AMF 122).

These rules may sometimes (A) allow a UE 105 access to a non-allowed area or (B) deny UE 105 access to an allowed area. However, if service areas are carefully managed to always indicate allowed TAs nearby to a UE 105, it is more likely that (A) will occur but not (B). That will avoid reducing UE 105 PLMN access compared to TN and provide some additional access not possible with TN but not unlimited additional access.

Figure 9:
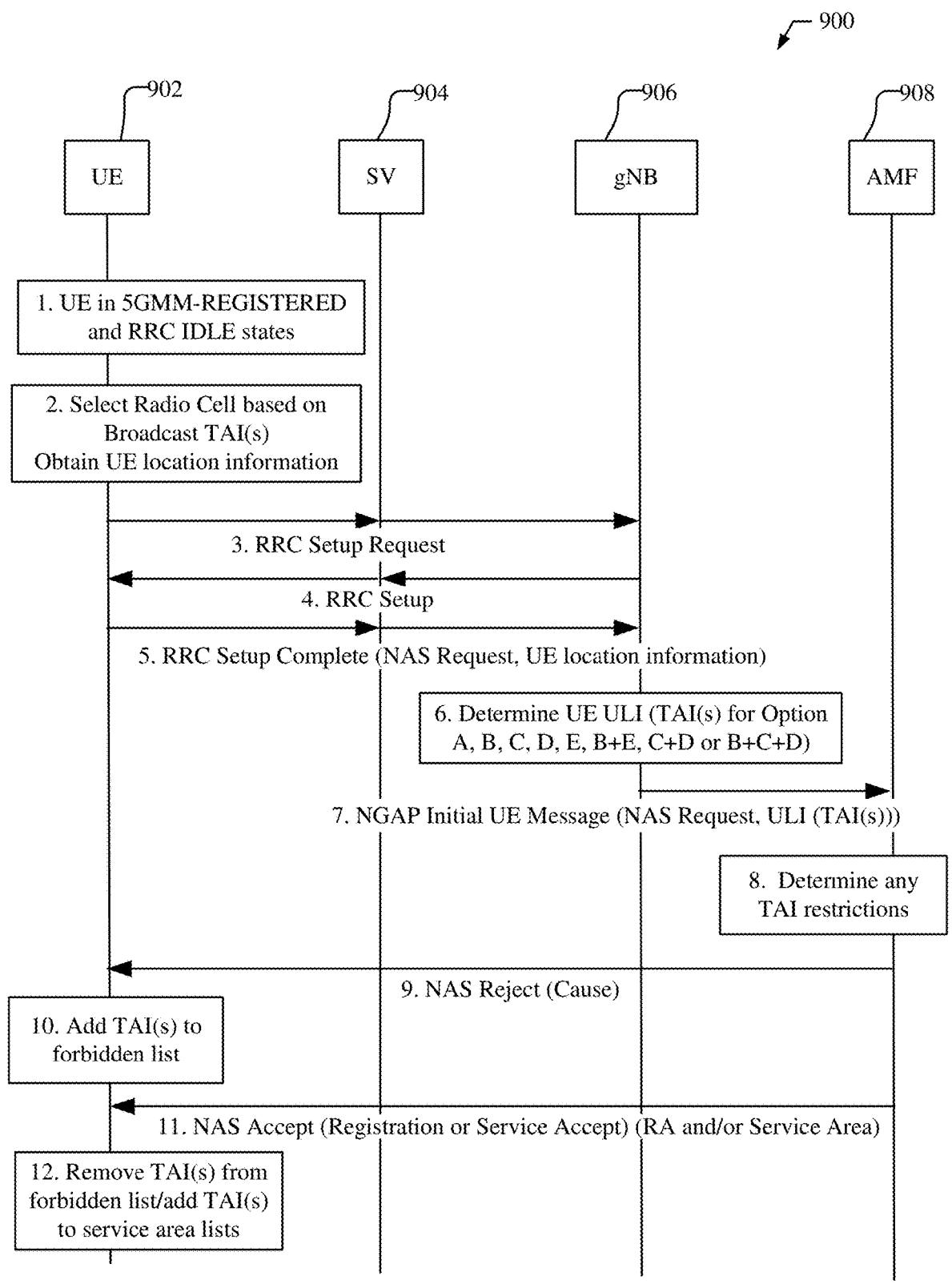
FIG. 9 shows a signaling flow that illustrates various messages sent between components of a communication network in a procedure for supporting TAI updates.

FIG. 9 shows a signaling flow 900 that illustrates various messages sent between components of a PLMN with satellite access in a procedure that supports TAI updates, as discussed herein. The signaling flow 900 may be performed by entities in the network architectures 100, 200 or 300 for FIG. 1, 2 or 3, respectively, in which the UE 902 corresponds to UE 105, SV 904 corresponds to an SV 102, 202 or 302, gNB 906 corresponds to a gNB 106/202/307, and AMF 908 corresponds to AMF 122. It should be understood that the gNB 906 or an element of the gNB 906 may be included within the SV 904. For example, with an SV 202, a gNB 202 would be completely included within the SV 202 as described for FIG. 2. Alternatively, with an SV 302, a gNB 307 (also referred to as an gNB-CU) would be terrestrial and physically separate from the SV 302, but the SV 302 would include an gNB-DU 302 as described for FIG. 3. In some implementations, an eNB may be used in place of gNB 906, and an MME may be used in place of AMF 908. Additional or fewer stages/messages may be included in the signaling flow 900.

At stage 1 in FIG. 9, the UE 902 may start off in 5G System (5GS) Mobility Management (5GMM)-REGISTERED and RRC IDLE states. During registration (e.g. a previous occurrence of stage 11), the AMF 908 may have provided a list of TAIs in a UE RA or a priority ordered list of TAIs in a UE RA based on proximity of the corresponding TAs to the location of the UE 902 as described for FIG. 8.

At stage 2, the UE 902 receives broadcast TAI information from SV 904 (and possibly from other SVs not shown in FIG. 9) for one or more radio cells indicating one or more TAIs supported by each radio cell, and selects a radio cell (and an associated SV 904) based on the radio cell being allowed for the UE 902. The UE 902 may determine whether access is allowed to the radio cell based on the rule 1 described previously. Access may be allowed unconditionally if at least one broadcast TAI is part of the current UE 902 RA or if at least one broadcast TAI is not part of a non-allowed TAI list and not part of a forbidden TAI list for UE 902 (e.g. is part of an allowed TAI list for the UE 902). When unconditional access is not allowed, conditional access for the UE 105 to send a NAS Registration Request message (but not necessarily other NAS messages) can be allowed if at least one broadcast TAI is not part of a forbidden TAI list for UE 902, e.g. if some or all broadcast TAIs are part of a non-allowed TAI list for UE 902. The UE 902 may also obtain location information such as a location estimate for the UE 902, e.g. by obtaining measurements for SPS SVs 190 and using the measurement to determine a location estimate. If access to the radio cell is not allowed at stage 2, stages 3 to 12 are not performed. If access (conditional or unconditional) to the radio cell is allowed at stage 2, stages 3 to 12 can be performed.

At stage 3, the UE 902 performs a random access procedure to obtain permission from gNB 906 for uplink (UL) transmission (not shown in FIG. 9) and then sends an RRC Setup Request to the gNB 906 supporting the radio cell selected at stage 2 to request an RRC signaling connection.

At stage 4, the gNB 906 returns an RRC Setup message to the UE 902.

At stage 5, the UE 902 sends an RRC Setup Complete message that includes a NAS Request message. The NAS Request may be a request for a NAS procedure or may be to provide information to the AMF 908. The NAS Request, for example, may be a Registration Request, Attach Request, Service Request, or PDU Session Establishment Request, or an Uplink (UL) NAS Transport. The NAS Request may require a NAS Response or in some implementations a NAS Response may not be necessary. In some implementations, the UE 902 may include a plurality of TACs or TAIs from the broadcast TAI information received in the selected radio cell in stage 2. In some implementations (e.g. for Option B), the UE 902 may select and include a TAC or TAI in the RRC Setup Complete message if the NAS Request is not a Registration Request. For example, for Option B, Option B+E or Option B+C+D, the UE 902 may select and include one TAI from the TAIs broadcast in the selected radio cell and may additionally give preference to a TAI in the UE 902 RA or a TAI with a higher priority in the UE 902 RA, e.g., as described above for Option B. The UE 902 may also include in the RRC Setup Complete message any UE location information (e.g. a location estimate for UE 902) obtained at stage 2.

At stage 6, the gNB 906 determines the UE 902 User Location Information (ULI) including a TAI or TAIs, as discussed above, for one of Options A, B, C, D, or E, or some combination thereof (e.g. Option B+E, Option B+C+D or Option C+D). The gNB 906 may make use of UE 902 location information received at stage 5 or already known to the gNB 906 (e.g. from the radio cell coverage area) in order to determine a TAI or TAIs. For example, as discussed above for Option C (or Option C+D), the gNB 906 may select the TAI as the TAI for the TA in which the UE 902 is located if this TA can be determined or may include an indication in the ULI (e.g. a Null TAC or Null TAI value) if the TA cannot be determined due to either insufficient UE 902 location information received at stage 5 or an inability of gNB 906 to map the UE 902 location information to a TA in which the UE 902 is located. For example, as discussed above in Option E, the gNB 906 may select the TAI as the TAI for the TA in which the UE 902 is located if a TAI for this TA is broadcast in the serving radio cell; otherwise the gNB 906 may select the TAI broadcast in the serving cell for the TA that is closest to the UE 902 (e.g. as indicated by the UE location information received at stage 5). In some implementations (e.g. for Option B), and as discussed above, the gNB 906 may determine the TAI based on the TAI provided by the UE 902 in the RRC message of stage 5. In some implementations, e.g., for Option D or Option C+D, the gNB 906 may include an indication of all the TAIs broadcast in the radio cell or generate and include a prioritized list of these TAIs based on proximity of each of the corresponding TAs to the UE 902 (e.g. as indicated by the UE location information received at stage 5). For combined options, the gNB 906 can include several types of TAIs in the ULI. For example for Option C+D, the gNB 906 can include the TAI for the TA in which the UE 902 is located if this TA can be determined or an indication (e.g. a Null TAI value) that this TA could not be determined otherwise, and can further include an indication of all the TAIs broadcast in the radio cell.

At stage 7, the gNB or gNB-CU 906 forwards the NAS Request to an AMF 908 in a serving PLMN for UE 902 in an NGAP transport message, such as an NGAP Initial UE message. The NGAP transport message includes the NAS Request as well as the ULI determined at stage 6, which includes the determined TAI and/or list of TAIs.

At stage 8, the AMF 908 may determine whether the TAI(s) for the UE 902 that is(are) included in the ULI received at stage 7 is(are) for a TA (or TAs) that is (are) allowed for the UE 902. The AMF 908 may use rule 2 as described previously to determine whether UE 902 access to the radio cell selected at stage 2 is allowed based on whether the TAI(s) is (are) allowed. For example, when Option D, Option C+D or Option B+C+D is used, the AMF 908 may determine that access to the radio cell is unconditionally allowed if at least one of the TAIs is allowed for the UE 902 (e.g. is not in a forbidden TAI list and not in a non-allowed TAI list for the UE 902). However, if all the TAIs broadcast in the radio cell are not allowed for the UE 902 (e.g. are each in a forbidden TAI list or in a non-allowed TAI list for the UE 902), the AMF 908 may determine that access by UE 902 is not unconditionally allowed. If all the TAIs broadcast in the radio cell are part of a forbidden TAI list for the UE 902, the AMF 908 may determine that access by UE 902 to the radio cell selected at stage 2 is not allowed. However, if all the TAIs broadcast in the radio cell are not allowed for the UE 902 but at least one TAI broadcast in the radio cell is not part of a forbidden TAI list for the UE 902 (e.g. is in a non-allowed TAI list for the UE 902), the AMF 908 may determine that access by UE 902 to the radio cell selected at stage 2 is allowed conditionally and may accept receipt of a Registration Request from UE 902 though may not accept other NAS messages from UE 902 like a Service Request.

At stage 9, if the TAI(s) is(are) not allowed in stage 8 such that access by UE 902 to the radio cell selected at stage 2 is not allowed (even conditionally), the AMF 908 sends to the UE 902 a NAS reject message indicating that the current TAI(s) is(are) forbidden. The NAS reject message, for example, may include the TAI(s) that are forbidden and/or a cause value indicating the reason for the rejection and indicating that the UE 902 is to include the TAI(s) in a list of forbidden TAIs for the UE 902. The NAS reject message may be a counterpart to the NAS Request and may reject a NAS procedure associated with the NAS Request. For example, the NAS Reject may be a Registration Reject, Service Reject, Attach Reject or a PDU Session Establishment reject.

At stage 10, if the UE 902 receives a TAI or list of TAIs and an indication that the TAI(s) is(are) forbidden, the UE 902 adds the received TAI(s) to a list of forbidden TAIs for the UE 902. If the UE 902 receives an indication that a TAI is forbidden but does not receive a TAI or a list of TAIs, the UE 902 may follow rule 3 as described previously and transfers into the list of forbidden TAIs all TAIs being broadcast in the serving radio cell. However, the UE 902 may not transfer into the forbidden TAI list any TAIs being broadcast that are either part of the current UE 902 RA or are included in an allowed TAI list for the UE 902. Stages 11 and 12 are then not performed.

At stage 11, if access to the radio cell is allowed or conditionally allowed in stage 8, the AMF 908 sends to the UE 902 a NAS accept message, which may be a Registration Accept, an Attach Accept, or (e.g. if access is unconditionally allowed) a Service Accept message. If the NAS accept message is a Registration Accept message, the AMF 908 may include a new Registration Area (RA) for the UE 902, which is a list of TAIs that the UE 902 is allowed to use. The AMF 908 may normally include the TAI received at stage 7 in the RA if just one TAI was received and may further include additional TAIs for TAs nearby to the TA for the TAI received at stage 7. For Option D or Option C+D, if the TAIs received at stage 7 are prioritized with TAIs for TAs closer to the UE 902 included earlier in a priority list, the AMF 908 can include one or more of the higher priority TAIs in the RA (e.g. the highest priority TAI and maybe one or more of the next highest priority TAIs). For Option D or Option C+D, if the TAIs are not prioritized, the AMF 908 can include at least one of the TAIs that are broadcast in the radio cell in the RA. For Option C+D, the AMF 908 can instead (i) include in the RA just the TAI for the TA in which the UE 902 is located (as received at stage 7 as part of the ULI) if this TA was determined by gNB 906 at stage 6 and if this TAI is one of the TAIs broadcast in the radio cell, and can otherwise (ii) include in the RA at least one of the TAIs broadcast in the radio cell. A Registration Accept message may further include a service area indication, which may include allowed areas (TAIs) and non-allowed areas (TAIs) for the UE 902.

At stage 12, if the UE 902 receives a new RA in stage 11, the UE 902 may follow rule 4 as described previously and may remove from a list of forbidden TAIs for the UE 902 any TAIs in the list of forbidden TAIs that are included in the new RA. Similarly, if the UE 902 receives a service area indication in stage 11, the UE 902 may further remove from a list of forbidden TAIs for UE 902 any TAIs in the list of forbidden TAIs that were included in a list of allowed TAIs received at stage 11 for a service area.

It is noted that each of Options A to E, Option C+D, Option B+C+D, rules 1 to 4 and signaling flow 900 as described previously can be applicable to satellite wireless access using other types of satellite RAT such as LTE, NB-IoT or a future 6G, as long as fixed TAs continue to be used to support mobility management of UEs. In such cases, references to a gNB above would be replaced by a different type of base station (e.g. an eNB or ng-eNB for LTE satellite access or an eNB for NB-IoT satellite access); references to an AMF above would be replaced by a different type of core network node (e.g. an MME for LTE or NB-IoT satellite access); and references to type of a NAS message (e.g. a NAS request, NAS accept or NAS reject) may be replaced by another type of NAS message applicable to the other satellite RAT (e.g. in the case of LTE or NB-IoT satellite access, a NAS Attach Request may replace a NAS Registration Request, a NAS Attach Accept may replace a NAS Registration Accept and a NAS Attach Reject may replace a NAS Registration Reject).

Figure 10:
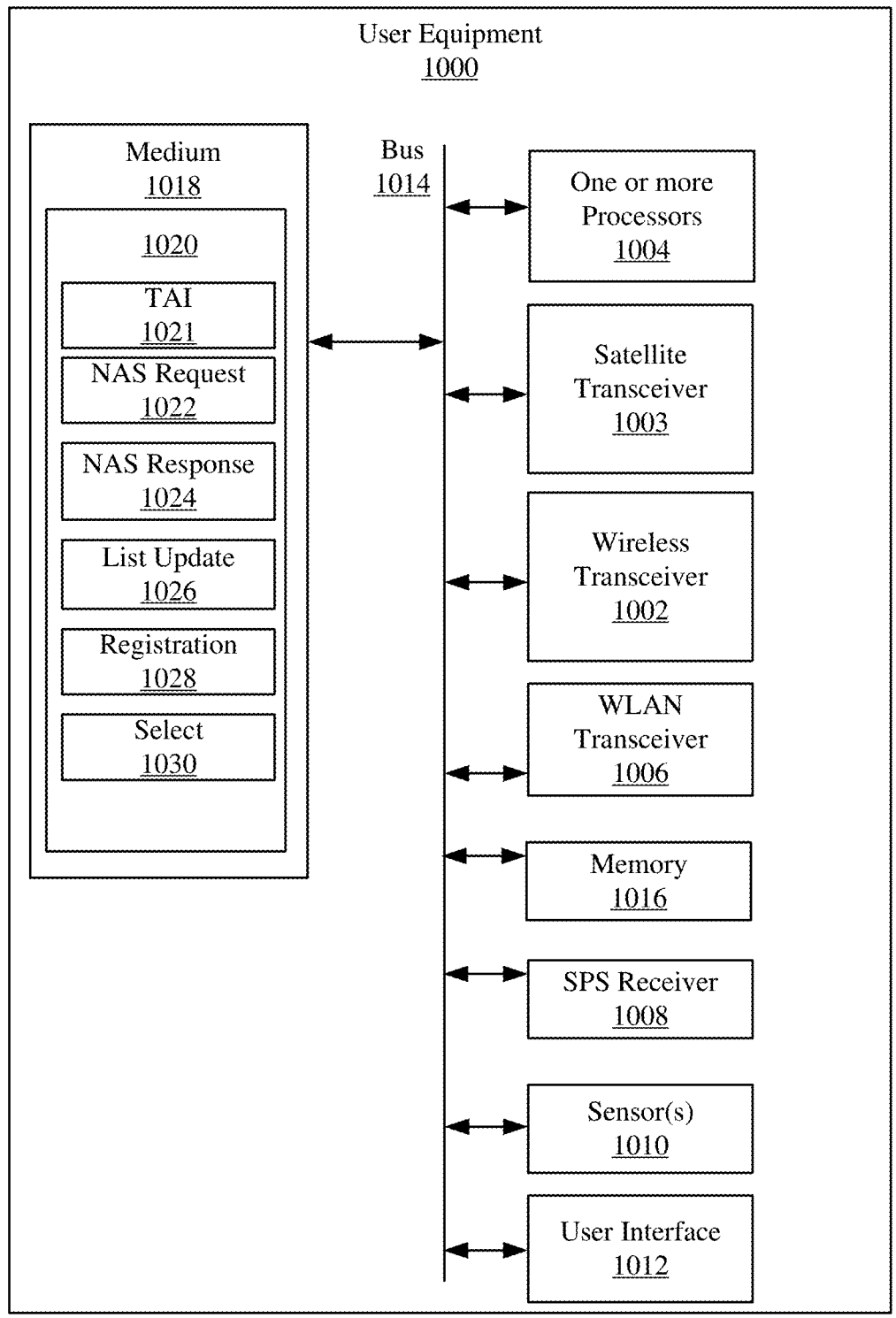
FIG. 10 is a diagram illustrating an example of a hardware implementation of UE configured to support TAI updates as discussed herein.

FIG. 10 is a diagram illustrating an example of a hardware implementation of UE 1000, such as UE 105 shown in FIGS. 1, 2, and 3, or UE 902 shown in FIG. 9. The UE 1000 may be configured to perform the signal flow in FIG. 9 and the process flow 1500 of FIG. 15 and algorithms disclosed herein. The UE 1000 may include, e.g., hardware components such as a satellite transceiver 1003 to wirelessly communicate with an SV 102/202/302 via a wireless antenna (not shown in FIG. 10), e.g., as shown in FIGS. 1, 2, and 3. The UE 1000 may further include wireless transceiver 1002 to wirelessly communicate with terrestrial base stations in an NG-RAN 112 via a wireless antenna (not shown in FIG. 10), e.g., base stations such as a gNB or an ng-eNB. The UE 1000 may also include additional transceivers, such a wireless local area network (WLAN) transceiver 1006, as well as an SPS receiver 1008 for receiving and measuring signals from SPS SVs 190 (shown in FIGS. 1, 2, and 3) via a wireless antenna (not shown in FIG. 10). In some implementations, the UE 1000 may receive data from a satellite, e.g., via satellite transceiver 1003, and may respond to a terrestrial base station, e.g., via wireless transceiver 1002, or via WLAN transceiver 1006. Thus, UE 1000 may include one or more transmitters, one or more receives or both, and these may be integrated, discrete, or a combination of both. The UE 1000 may further include one or more sensors 1010, such as cameras, accelerometers, gyroscopes, electronic compass, magnetometer, barometer, etc. The UE 1000 may further include a user interface 1012 that may include e.g., a display, a keypad or other input device, such as virtual keypad on the display, through which a user may interface with the UE 1000. The UE 1000 further includes one or more processors 1004, memory 1016, and non-transitory computer readable medium 1018, which may be coupled together with bus 1014. The one or more processors 1004 and other components of the UE 1000 may similarly be coupled together with bus 1014, a separate bus, or may be directly connected together or coupled using a combination of the foregoing.

The one or more processors 1004 may be implemented using a combination of hardware, firmware, and software. For example, the one or more processors 1004 may be configured to perform the functions discussed herein by implementing one or more instructions or program code 1020 on a non-transitory computer readable medium, such as medium 1018 and/or memory 1016. In some embodiments, the one or more processors 1004 may represent one or more circuits configurable to perform at least a portion of a data signal computing procedure or process related to the operation of UE 1000.

Figure 15:
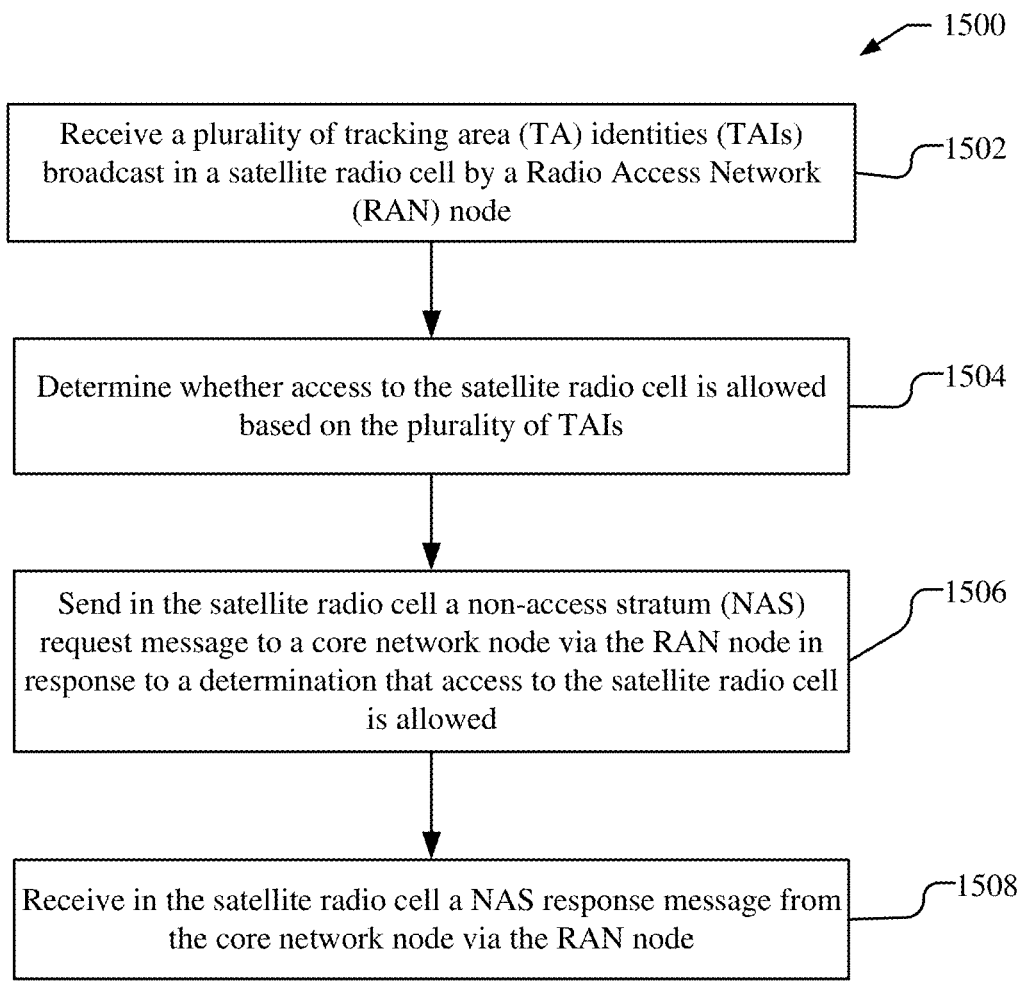
FIG. 15 shows a flowchart of an example procedure for supporting satellite wireless access by a user equipment (UE) to a serving public land mobile network (PLMN), performed by the UE.

The medium 1018 and/or memory 1016 may store instructions or program code 1020 that contain executable code or software instructions that when executed by the one or more processors 1004 cause the one or more processors 1004 to operate as a special purpose computer programmed to perform the techniques disclosed herein (e.g. such as the signal flows of FIG. 9 and the process flow 1500 of FIG. 15 and supporting techniques described herein). As illustrated in UE 1000, the medium 1018 and/or memory 1016 may include one or more components or modules that may be implemented by the one or more processors 1004 to perform the methodologies described herein. While the components or modules are illustrated as software in medium 1018 that is executable by the one or more processors 1004, it should be understood that the components or modules may be stored in memory 1016 or may be dedicated hardware either in the one or more processors 1004 or off the processors.

A number of software modules and data tables may reside in the medium 1018 and/or memory 1016 and be utilized by the one or more processors 1004 in order to manage both communications and the functionality described herein. It should be appreciated that the organization of the contents of the medium 1018 and/or memory 1016 as shown in UE 1000 is merely exemplary, and as such the functionality of the modules and/or data structures may be combined, separated, and/or be structured in different ways depending upon the implementation of the UE 1000. While the components or modules are illustrated as software in medium 1018 and/or memory 1016 that is executable by the one or more processors 1004, it should be understood that the components or modules may be firmware or dedicated hardware either in the one or more processors 1004 or off the processors.

As illustrated, the program code 1020 stored on medium 1018 and/or memory 1016 may include a TAI module 1021 that when implemented by the one or more processors 1004 configures the one or more processors 1004 to receive, via wireless transceiver 1002 or satellite transceiver 1003, a plurality of TAIs broadcast in a satellite radio cell by a RAN node. The one or more processors 1004 may be further configured to determine whether access to the satellite radio cell is allowed based on the plurality of TAIs. For example, the one or more processors 1004 may be configured to determine that access is unconditionally allowed when at least one of the plurality of TAIs is part of a current UE RA or is part of an allowed TAI list for the UE, to determine that access is conditionally allowed when access is not unconditionally allowed and when at least one of the plurality of TAIs is not part of a forbidden TAI list for the UE, and to determine that access is not allowed when all of the plurality of TAIs are part of the forbidden TAI list for the UE.

As illustrated, the program code 1020 stored on medium 1018 and/or memory 1016 may include a NAS Request module 1022 that when implemented by the one or more processors 1004 configures the one or more processors 1004 to send, via wireless transceiver 1002 or satellite transceiver 1003, a non-access stratum (NAS) request to a core network node, such as AMF 122, in the satellite radio cell via the RAN node when access to the satellite radio cell is determined to be allowed. The NAS request message, for example, may be any uplink NAS message when the access is determined to be unconditionally allowed, wherein the NAS message may comprise a NAS Registration Request or NAS Attach Request when the access is determined to be conditionally allowed.

As illustrated, the program code 1020 stored on medium 1018 and/or memory 1016 may include a NAS response module 1024 that when implemented by the one or more processors 1004 configures the one or more processors 1004 to receive, via wireless transceiver 1002 or satellite transceiver 1003, a NAS response message from the core network node in the satellite radio cell via the RAN node.

As illustrated, the program code 1020 stored on medium 1018 and/or memory 1016 may include a list update module 1026 that when implemented by the one or more processors 1004 configures the one or more processors 1004 to store, e.g., in memory 1016 or medium 1018, all of the multiple TAs that are not included in either a current registration area or a list of allowed areas, into a list of forbidden TAs and to remove any TAs included in a new registration area or new list of allowed areas from the list of forbidden TAs. For example, the NAS request message may include a NAS Registration Request and the NAS response message may include a NAS Registration Accept message or the NAS request message may include a NAS Attach Request and the NAS response message may include a NAS Attach Accept message, and the NAS accept message may at least one of a registration area (RA) including a first list of TAIs and an allowed TAI list including a second list of TAIs, and the one or more processors 1004 may be configured to remove each TAI in the first list of TAIs or in the second list of TAIs or in both the first and second lists of TAIs from a list of forbidden TAIs for the UE when the each TAI is part of the forbidden list of TAIs. In another example, the NAS request message may include a NAS Registration Request and the NAS response message may include a NAS Registration Reject message or the NAS request message may include a NAS Attach Request and the NAS response message may include a NAS Attach Reject message, wherein the NAS response message indicates a forbidden tracking area and includes a list of TAIs, and the one or more processors 1004 may be configured to add each TAI in the list of TAIs to a list of forbidden TAIs for the UE. In another example, the NAS request message may include a NAS Registration Request and the NAS response message may include a NAS Registration Reject message or the NAS request message may include a NAS Attach Request and the NAS response message may include a NAS Attach Reject message, wherein the NAS response message indicates a forbidden tracking area and does not include a list of TAIs, and the one or more processors 1004 may be configured to add each TAI in the plurality of TAIs to a list of forbidden TAIs for the UE.

As illustrated, the program code 1020 stored on medium 1018 and/or memory 1016 may include a registration module 1028 that when implemented by the one or more processors 1004 configures the one or more processors 1004 to receive, e.g., via wireless transceiver 1002 or satellite transceiver 1003, a new registration area or a new list of allowed areas.

As illustrated, the program code 1020 stored on medium 1018 and/or memory 1016 may include a select module 1030 that when implemented by the one or more processors 1004 configures the one or more processors 1004 to treat a satellite radio cell as associated with a forbidden TA if any of the multiple TAs for the PLMN in the radio cell broadcast from the satellite is on the list of forbidden TAs.

The methodologies described herein may be implemented by various means depending upon the application. For example, these methodologies may be implemented in hardware, firmware, software, or any combination thereof. For a hardware implementation, the one or more processors 1004 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1018 or memory 1016 and executed by one or more processors 1004, causing the one or more processors 1004 to operate as a special purpose computer programmed to perform the techniques disclosed herein. Memory may be implemented within the one or processors 1004 or external to the one or more processors 1004. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1000 may be stored as one or more instructions or code on a non-transitory computer-readable storage medium such as medium 1018 or memory 1016. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1000 may be provided as signals on transmission media included in a communication apparatus. For example, a communication apparatus comprising part or all of UE 1000 may include a transceiver having signals indicative of instructions and data. The instructions and data are stored on non-transitory computer readable medium 1018 or memory 1016, and are configured to cause the one or more processors 1004 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 11:
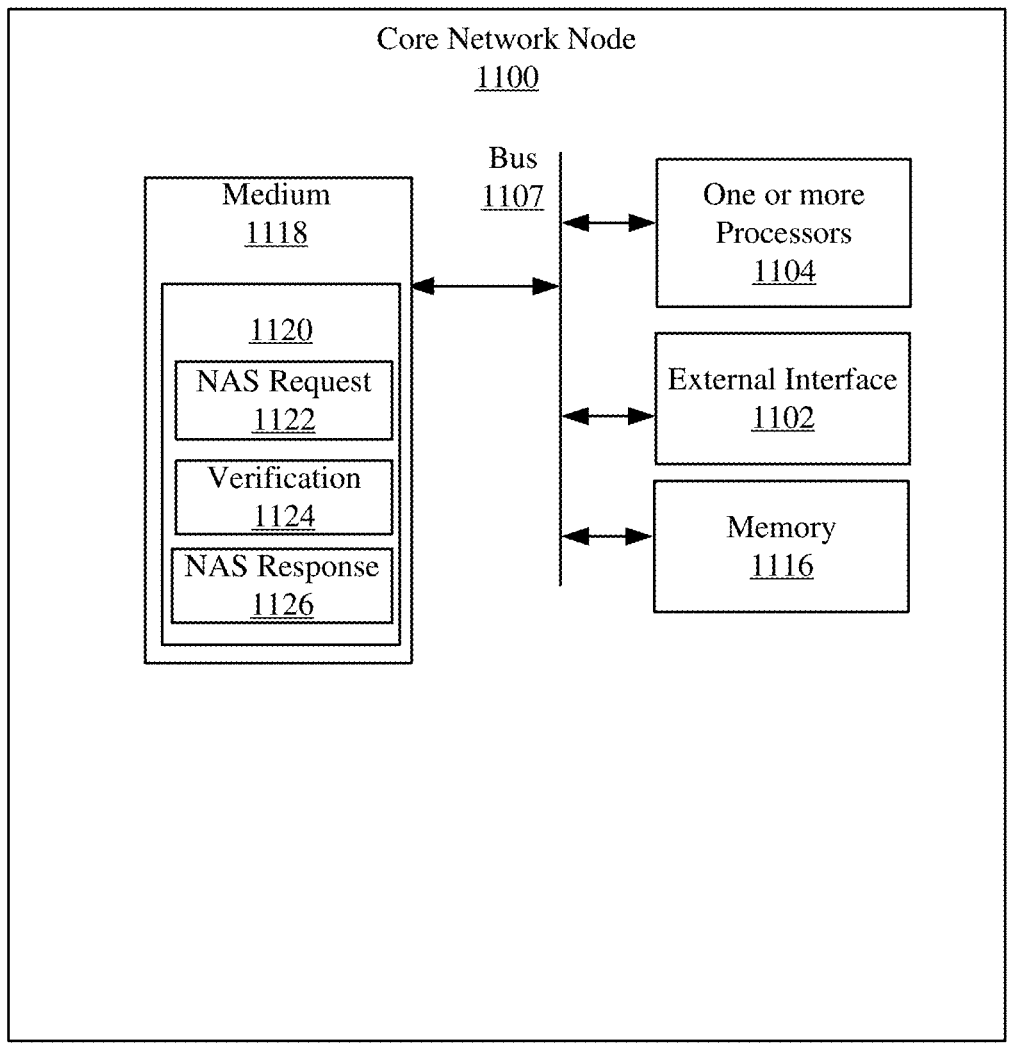
FIG. 11 is a diagram illustrating an example of a hardware implementation of a core network node configured to support TAI updates as discussed herein.

FIG. 11 is a diagram illustrating an example of a hardware implementation of a core network node 1100 in a PLMN. The core network node 1100, for example, may be AMF 122 shown in FIGS. 1, 2, and 3, AMF 908 shown in FIG. 9 or may be an MME supporting LTE or NB-IoT satellite access by a UE. The core network node 1100 may perform the signal flow of FIG. 9 and the process flow 1400 of FIG. 14 and algorithms disclosed herein. The network node 1100 includes, e.g., hardware components such as an external interface 1102 configured to be communication with other network components in the PLMN. The network node 1100 includes one or more processors 1104, memory 1116, and non-transitory computer readable medium 1118, which may be coupled together with bus 1107.

The one or more processors 1104 may be implemented using a combination of hardware, firmware, and software. For example, the one or more processors 1104 may be configured to perform the functions discussed herein by implementing one or more instructions or program code 1120 on a non-transitory computer readable medium, such as medium 1118 and/or memory 1116. In some embodiments, the one or more processors 1104 may represent one or more circuits configurable to perform at least a portion of a data signal computing procedure or process related to the operation of network node 1100.

Figure 14:
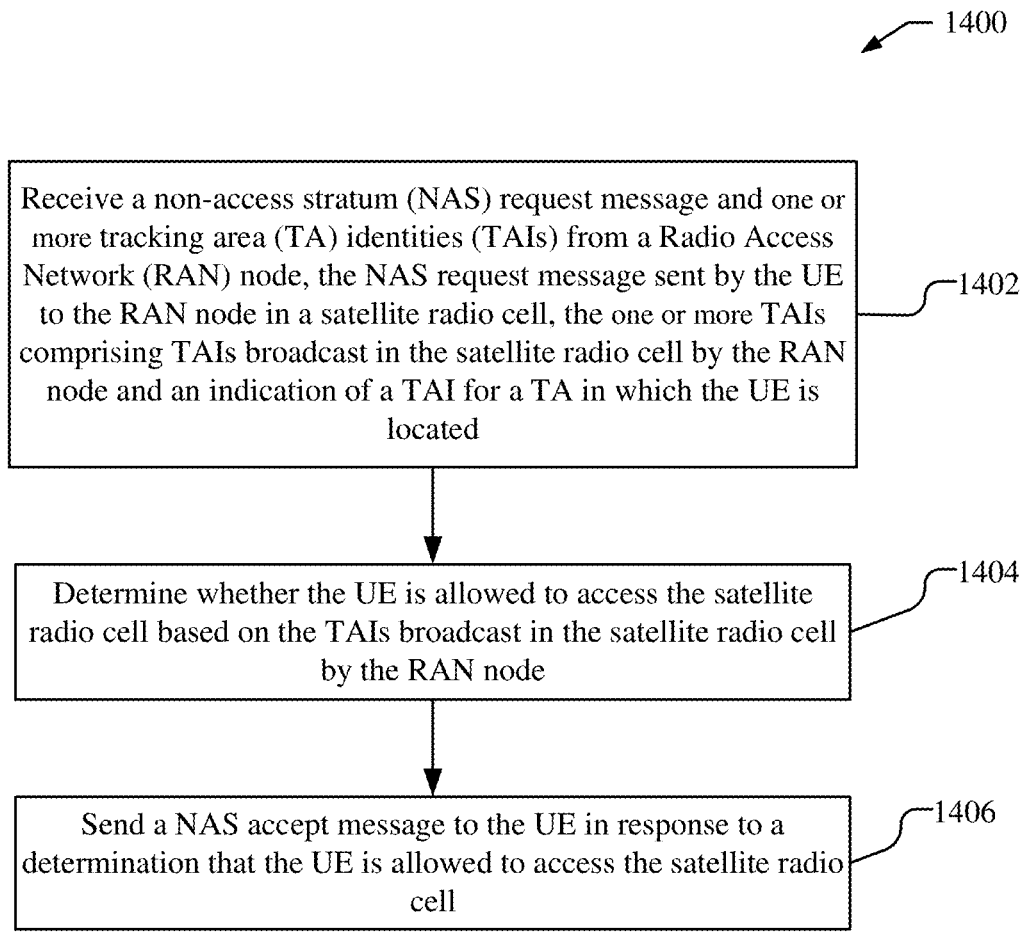
FIG. 14 shows a flowchart of an example procedure for supporting satellite wireless access by a user equipment to a serving public land mobile network (PLMN), performed by a core network node.

The medium 1118 and/or memory 1116 may store instructions or program code 1120 that contain executable code or software instructions that when executed by the one or more processors 1104 cause the one or more processors 1104 to operate as a special purpose computer programmed to perform the techniques disclosed herein (e.g. such as the signal flows of FIG. 9 and the process flow 1400 of FIG. 14 and supporting algorithms described herein). As illustrated in network node 1100, the medium 1118 and/or memory 1116 may include one or more components or modules that may be implemented by the one or more processors 1104 to perform the methodologies described herein. While the components or modules are illustrated as software in medium 1118 that is executable by the one or more processors 1104, it should be understood that the components or modules may be stored in memory 1116 or may be dedicated hardware either in the one or more processors 1104 or off the processors.

A number of software modules and data tables may reside in the medium 1118 and/or memory 1116 and be utilized by the one or more processors 1104 in order to manage both communications and the functionality described herein. It should be appreciated that the organization of the contents of the medium 1118 and/or memory 1116 as shown in network node 1100 is merely exemplary, and as such the functionality of the modules and/or data structures may be combined, separated, and/or be structured in different ways depending upon the implementation of the network node 1100. While the components or modules are illustrated as software in medium 1118 and/or memory 1116 that is executable by the one or more processors 1104, it should be understood that the components or modules may be firmware or dedicated hardware either in the one or more processors 1104 or off the processors.

As illustrated, the program code 1120 stored on medium 1118 and/or memory 1116 may include a NAS Request module 1122 that when implemented by the one or more processors 1104 configures the one or more processors 1104 to receive, via external interface 1102, a non-access stratum (NAS) request message and one or more TAIs from a Radio Access Network (RAN) node, the NAS request message sent by the UE to the RAN node in a satellite radio cell, and the one or more TAIs including TAIs broadcast in the satellite radio cell by the RAN node and an indication of a TAI for a TA in which the UE is located.

As illustrated, the program code 1120 stored on medium 1118 and/or memory 1116 may include a verification module 1124 that when implemented by the one or more processors 1104 configures the one or more processors 1104 to determine whether the UE is allowed to access the satellite radio cell based on the TAIs broadcast in the satellite radio cell by the RAN node.

As illustrated, the program code 1120 stored on medium 1118 and/or memory 1116 may include a NAS response module 1126 that when implemented by the one or more processors 1104 configures the one or more processors 1104 to send, e.g., via external interface, a NAS accept message to the UE when the UE is allowed to access the satellite radio cell. For example, the NAS request message may be a NAS Registration Request and the NAS accept message may be a NAS Registration Accept or the NAS request message may be a NAS Attach Request and the NAS accept message may be a NAS Attach Accept. The one or more processors 1104 may be configured to include registration area (RA) in the NAS accept message. The one or more processors 1104 may be configured to include in the RA the TAI for the TA in which the UE is located when the TAI for the TA in which the UE is located is one of the TAIs broadcast in the satellite radio cell by the RAN node. The one or more processors 1104 may be configured to include in the RA at least one of the TAIs broadcast in the satellite radio cell by the RAN node when the TAI for the TA in which the UE is located is not one of the TAIs broadcast in the satellite radio cell by the RAN node. The one or more processors 1104 may be configured to include in the RA at least one of the TAIs broadcast in the satellite radio cell by the RAN node when the indication of the TAI for the TA in which the UE is located indicates that the TA in which the UE is located was not determined by the RAN node.

The methodologies described herein may be implemented by various means depending upon the application. For example, these methodologies may be implemented in hardware, firmware, software, or any combination thereof. For a hardware implementation, the one or more processors 1104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network node 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1118 or memory 1116 and executed by one or more processors 1104, causing the one or more processors 1104 to operate as a special purpose computer programmed to perform the techniques disclosed herein. memory may be implemented within the one or processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by network node 1100 may be stored as one or more instructions or code on a non-transitory computer-readable storage medium such as medium 1118 or memory 1116. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network node 1100 may be provided as signals on transmission media included in a communication apparatus. For example, a communication apparatus comprising part or all of network node 1100 may include a transceiver having signals indicative of instructions and data. The instructions and data are stored on non-transitory computer readable media, e.g., medium 1118 or memory 1116, and are configured to cause the one or more processors 1104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 12:
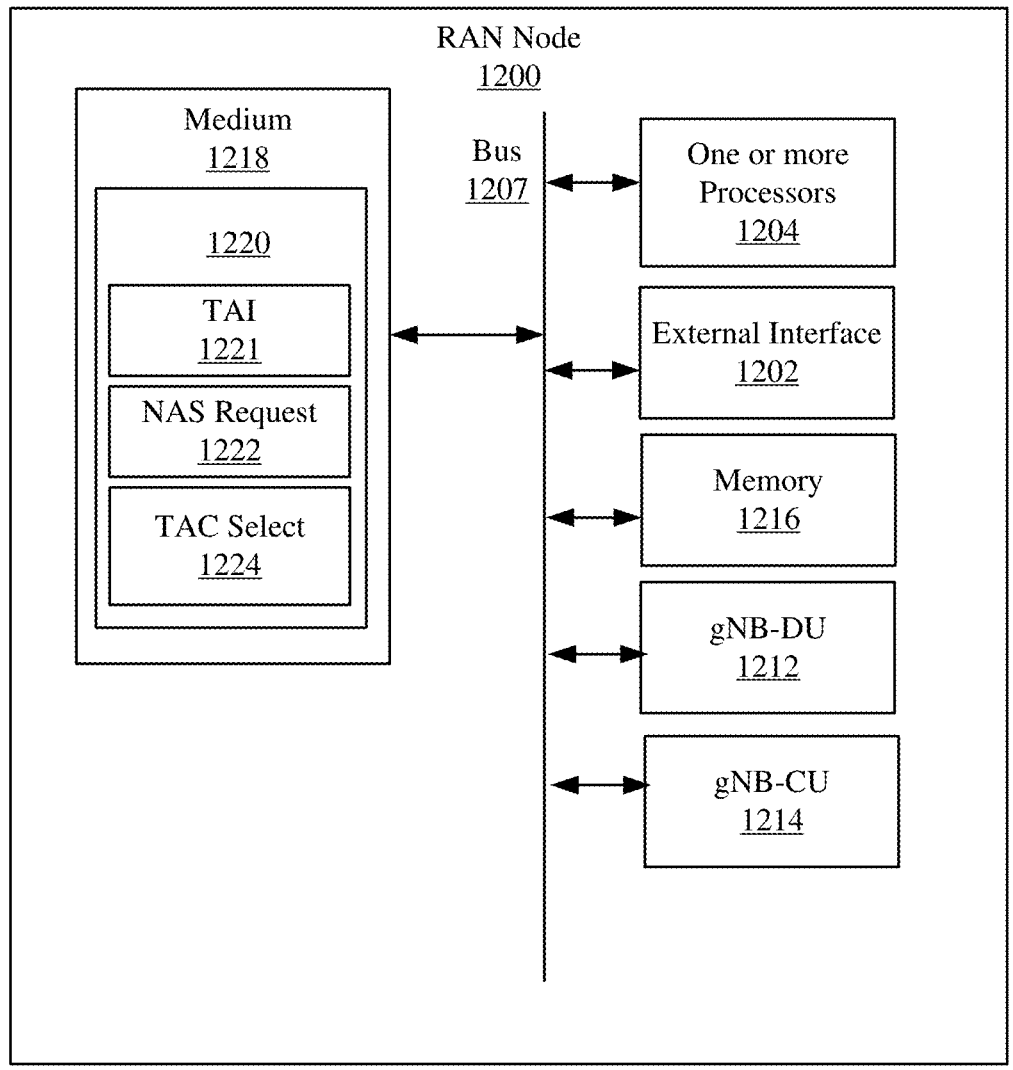
FIG. 12 is a diagram illustrating an example of a hardware implementation of a network node configured to support TAI updates as discussed herein.

FIG. 12 is a diagram illustrating an example of a hardware implementation of a RAN node 1200, such as a NR node B (gNB) or eNB. The RAN node 1200 may correspond to any of: (i) gNB 106 illustrated in FIG. 1; (ii) gNB 202 in the SV 202 illustrated in FIG. 2; or (iii) gNB-DU 302 in the SV 302 or gNB-CU 307 illustrated in FIG. 3. The RAN node 1200 may perform the signal flow 900 of FIG. 9 and process flow 1300 of FIG. 13 and algorithms disclosed herein. The RAN node 1200 may include, e.g., hardware components such as an external interface 1202, which may comprise one or more wired and/or wireless interfaces capable of connecting to and communicating with one or more entities in a core network in a PLMN, such as AMF 122 or UPF 130 in 5GCN 110 shown in FIG. 2, and earth stations 104, as well as other gNBs, UEs 105 (e.g. when RAN node 1200 is part of an SV 202 or SV 302) and to other elements in a wireless network directly or through one or more intermediary networks and/or one or more network entities, as shown in FIGS. 1, 2, and 3. The external interface 1202 may include one or more antennas to support a wireless interface and/or a wireless backhaul to elements in the wireless network. The RAN node 1200 further includes one or more processors 1204, memory 1216, and non-transitory computer readable medium 1218, which may be coupled together with bus 1207. The RAN node 1200 is illustrated as including a gNB-DU 1212 and/or gNB-CU 1214 (e.g. in the case that RAN node 1200 corresponds to gNB 202 in FIG. 2 with gNB 202 comprising a gNB-CU and one or more gNB-Dus), which may be hardware components or implemented by specifically configured one or more processors 1204. gNB-DU 1212 and gNB-CU 1214 may not be present when RAN node 1200 itself corresponds to a gNB-DU (e.g. gNB-DU 302) or to a gNB-CU (e.g. gNB-CU 307).

The one or more processors 1204 may be implemented using a combination of hardware, firmware, and software. For example, the one or more processors 1204 may be configured to perform the functions discussed herein by implementing one or more instructions or program code 1220 on a non-transitory computer readable medium, such as medium 1218 and/or memory 1216. In some embodiments, the one or more processors 1204 may represent one or more circuits configurable to perform at least a portion of a data signal computing procedure or process related to the operation of RAN node 1200.

Figure 13:
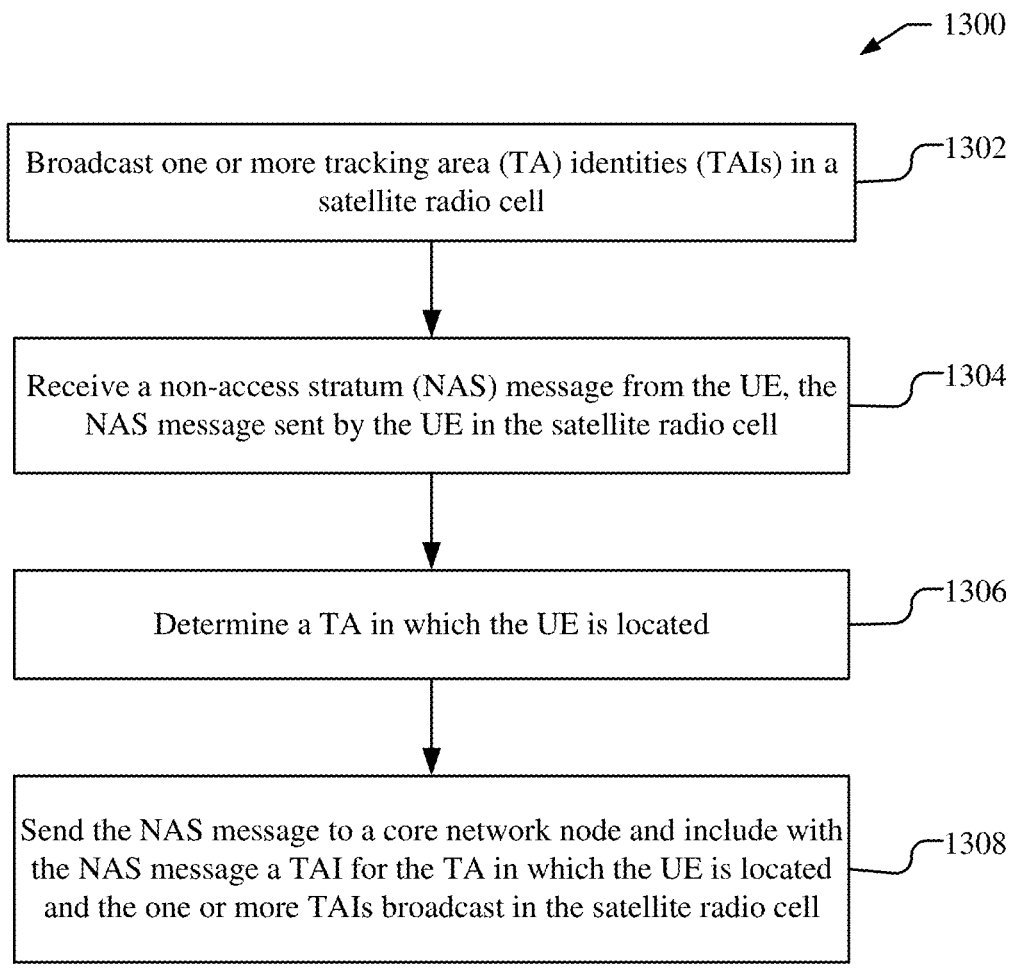
FIG. 13 shows a flowchart of an example procedure for supporting satellite wireless access by a user equipment to a serving public land mobile network (PLMN), performed by a Radio Access Network (RAN) Node.

The medium 1218 and/or memory 1216 may store instructions or program code 1220 that contain executable code or software instructions that when executed by the one or more processors 1204 cause the one or more processors 1204 to operate as a special purpose computer programmed to perform the techniques disclosed herein (e.g. such as the signal flows of FIG. 9 and the process flow 1300 of FIG. 13 and supporting algorithms described herein). As illustrated in RAN node 1200, the medium 1218 and/or memory 1216 may include one or more components or modules that may be implemented by the one or more processors 1204 to perform the methodologies described herein. While the components or modules are illustrated as software in medium 1218 that is executable by the one or more processors 1204, it should be understood that the components or modules may be stored in memory 1216 or may be dedicated hardware either in the one or more processors 1204 or off the processors.

A number of software modules and data tables may reside in the medium 1218 and/or memory 1216 and be utilized by the one or more processors 1204 in order to manage both communications and the functionality described herein. It should be appreciated that the organization of the contents of the medium 1218 and/or memory 1216 as shown in RAN node 1200 is merely exemplary, and as such the functionality of the modules and/or data structures may be combined, separated, and/or be structured in different ways depending upon the implementation of the RAN node 1200. While the components or modules are illustrated as software in medium 1218 and/or memory 1216 that is executable by the one or more processors 1204, it should be understood that the components or modules may be firmware or dedicated hardware either in the one or more processors 1204 or off the processors.

As illustrated, the program code 1220 stored on medium 1218 and/or memory 1216 may include a TAI module 1221 that when implemented by the one or more processors 1204 configures the one or more processors 1204 to broadcast, via external interface 1202, one or more tracking area (TA) identities (TAIs) in a satellite radio cell.

As illustrated, the program code 1220 stored on medium 1218 and/or memory 1216 may include a NAS Request module 1222 that when implemented by the one or more processors 1204 configures the one or more processors 1204 to receive, via external interface 1202, a non-access stratum (NAS) message from the UE, the NAS message sent by the UE in the satellite radio cell. The one or more processors 1204 may be configured to send, via the external interface 1202, the NAS message to a core network node and include with the NAS message a TAI for the TA in which the UE is located and one or more TAIs broadcast in the satellite radio cell. The one or more processors 1204 may be configured to send, via the external interface 1202, the NAS message to the core network node and include with the NAS message the plurality of TAIs broadcast in the satellite radio cell and an indication that the TA in which the UE is located was not determined.

As illustrated, the program code 1220 stored on medium 1218 and/or memory 1216 may include a TAC Select module 1224 that when implemented by the one or more processors 1204 configures the one or more processors 1204 to determine a TA in which the UE is located.

The methodologies described herein may be implemented by various means depending upon the application. For example, these methodologies may be implemented in hardware, firmware, software, or any combination thereof. For a hardware implementation, the one or more processors 1204 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of RAN node 1200 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a medium 1218 or memory 1216 and executed by one or more processors 1204, causing the one or more processors 1204 to operate as a special purpose computer programmed to perform the techniques disclosed herein. Memory may be implemented within the one or processors 1204 or external to the one or more processors 1204. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by RAN node 1200 may be stored as one or more instructions or code on a non-transitory computer-readable storage medium such as medium 1218 or memory 1216. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for RAN node 1200 may be provided as signals on transmission media included in a communication apparatus. For example, a communication apparatus comprising part or all of RAN node 1200 may include a transceiver having signals indicative of instructions and data. The instructions and data are stored on non-transitory computer readable media, e.g., medium 1218 or memory 1216, and are configured to cause the one or more processors 1204 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

FIG. 13 shows a flowchart of an example procedure 1300 for supporting satellite wireless access of a user equipment (e.g. a UE 105, UE 902, UE 1000) to a serving public land mobile network (PLMN), performed by a Radio Access Network (RAN) node. The RAN node may correspond to a gNB 106, gNB 202, gNB 307, gNB 906, RAN node 1200 or to an eNB or ng-eNB supporting LTE for the UE or an eNB supporting NB-IOT access for the UE. Generally, the example procedure 1300 is applicable to Option C+D and rules 1 to 4 described previously.

As illustrated, at block 1302, the RAN node broadcasts one or more tracking area (TA) identities (TAIs) in a satellite radio cell, e.g., as discussed at stage 2 of FIG. 9. A means for broadcasting one or more tracking area (TA) identities (TAIs) in a satellite radio cell may be, e.g., the external interface 1202 and one or more processors 1204 with dedicated hardware or implementing executable code or software instructions in memory 1216 and/or medium 1218, such as the TAI module 1221, in RAN node 1200 in FIG. 12.

At block 1304, the RAN node receives a non-access stratum (NAS) message from the UE, the NAS message sent by the UE in the satellite radio cell, e.g., as discussed stage 5 of FIG. 9. A means for receiving a non-access stratum (NAS) message from the UE, the NAS message sent by the UE in the satellite radio cell may be, e.g., the external interface 1202 and one or more processors 1204 with dedicated hardware or implementing executable code or software instructions in memory 1216 and/or medium 1218, such as the NAS Request module 1222, in RAN node 1200 in FIG. 12.

At block 1306, the RAN node determines a TA in which the UE is located, e.g., as discussed at stage 6 of FIG. 9 and discussed in reference to option C and option C+D. A means for determining a TA in which the UE is located may be, e.g., the one or more processors 1204 with dedicated hardware or implementing executable code or software instructions in memory 1216 and/or medium 1218, such as the TAC select module 1224, in RAN node 1200 in FIG. 12.

At block 1308, the RAN node sends the NAS message to a core network node and includes with the NAS message a TAI for the TA in which the UE is located and the one or more TAIs broadcast in the satellite radio cell, e.g., as discussed at stage 7 of FIG. 9 and discussed in reference to option C+D. A means for sending the NAS message to a core network node and including with the NAS message a TAI for the TA in which the UE is located and the one or more TAIs broadcast in the satellite radio cell may be, e.g., the external interface 1202 and one or more processors 1204 with dedicated hardware or implementing executable code or software instructions in memory 1216 and/or medium 1218, such as the NAS Request module 1222, in RAN node 1200 in FIG. 12.

In one implementation, the RAN node may be an NR NodeB (gNB) and the core network node may be an Access and Mobility Management Function (e.g. the AMF 122) or the RAN node may be an evolved NodeB (eNB) and the core network node may be a Mobility Management Entity (MME), as discussed in reference to FIG. 9.

In one implementation, the one or more TAIs broadcast in the satellite radio cell may be a single TAI, e.g., as discussed for hard TAI update in association with FIG. 7.

In one implementation, the RAN node may fail to determine the TA in which the UE is located, e.g., as discussed at stage 6 of FIG. 9. The RAN node may then send the NAS message to the core network node and include with the NAS message the one or more TAIs broadcast in the satellite radio cell and an indication that the TA in which the UE is located was not determined, e.g., as discussed in stages 6 and 7 of FIG. 9 and discussed in reference to option C+D. A means for failing to determine the TA in which the UE is located may be, e.g., the one or more processors 1204 with dedicated hardware or implementing executable code or software instructions in memory 1216 and/or medium 1218, such as the TAC select module 1224, in RAN node 1200 in FIG. 12. A means for sending the NAS message to the core network node and including with the NAS message the plurality of TAIs broadcast in the satellite radio cell and an indication that the TA in which the UE is located was not determined may be, e.g., the external interface 1202 and one or more processors 1204 with dedicated hardware or implementing executable code or software instructions in memory 1216 and/or medium 1218, such as the NAS Request module 1222, in RAN node 1200 in FIG. 12.

FIG. 14 shows a flowchart of an example procedure 1400 for supporting satellite wireless access by a user equipment (e.g. a UE 105, UE 902, UE 1000) to a serving public land mobile network (PLMN), performed by a core network node. The core network node may correspond to an AMF 122, AMF 908, core network node 1100 or an MME supporting LTE or NB-IoT satellite access for the UE. Generally, the example procedure 1400 is applicable to Option C+D and rules 1 to 4 described previously.

As illustrated, at block 1402, the core network node receives a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located, as discussed at stages 2, 5, 6, and 7 of FIG. 9 and discussed in reference to option C+D. A means for receiving a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located may be, e.g., the external interface 1102, and one or more processors 1104 with dedicated hardware or implementing executable code or software instructions in memory 1116 and/or medium 1118, such as the NAS Request module 1122, in core network node 1100 in FIG. 11.

At block 1404, the core network node may determine whether the UE is allowed to access the satellite radio cell based on the TAIs broadcast in the satellite radio cell by the RAN node, as discussed at stage 8 of FIG. 9 and discussed in reference to option C+D and discussed in reference to rule 2. A means determining whether the UE is allowed to access the satellite radio cell based on the TAIs broadcast in the satellite radio cell by the RAN node may be, e.g., the external interface 1102, and one or more processors 1104 with dedicated hardware or implementing executable code or software instructions in memory 1116 and/or medium 1118, such as the verification module 1124, in core network node 1100 in FIG. 11.

At block 1406, the core network node may send a NAS accept message to the UE in response to a determination that the UE is allowed to access the satellite radio cell, as discussed at stage 8 and 11 of FIG. 9 and discussed in reference to option C+D and discussed in reference to rule 2. A means for sending a NAS accept message to the UE in response to a determination that the UE is allowed to access the satellite radio cell may be, e.g., the external interface 1102, and one or more processors 1104 with dedicated hardware or implementing executable code or software instructions in memory 1116 and/or medium 1118, such as the NAS response module 1126, in core network node 1100 in FIG. 11. [what about the NAS Reject (stage 9 of FIG. 9?]

In one implementation, the RAN node may be an NR NodeB (e.g. a gNB 106, 202 or 307) and the core network node may be an Access and Mobility Management Function (e.g. an AMF 122) or the RAN node may be an evolved NodeB (eNB) and the core network node may be a Mobility Management Entity (MME), e.g., as discussed in reference to FIG. 9.

In one implementation, the one or more TAIs broadcast in the satellite radio cell may comprise a single TAI, e.g., as discussed for hard TAI update in association with FIG. 7.

In one implementation, the NAS request message may be a NAS Registration Request and the NAS accept message may be a NAS Registration Accept or the NAS request message may be a NAS Attach Request and the NAS accept message may be a NAS Attach Accept, e.g., as discussed in stages 5 and 11 of FIG. 9. The core network node may then include a registration area (RA) in the NAS accept message, e.g., as discussed in stage 11 of FIG. 9 and discussed in reference to option C+D and discussed in reference to rule 2. The core network node may include in the RA the TAI for the TA in which the UE is located if the TAI for the TA in which the UE is located is one of the TAIs broadcast in the satellite radio cell by the RAN node, e.g., as discussed in stage 11 of FIG. 9 and discussed in reference to option C+D. The core network node may include in the RA at least one of the TAIs broadcast in the satellite radio cell by the RAN node if the TAI for the TA in which the UE is located is not one of the TAIs broadcast in the satellite radio cell by the RAN node, e.g., as discussed in stage 11 of FIG. 9 and discussed in reference to option C+D. The core network node may include in the RA at least one of the TAIs broadcast in the satellite radio cell by the RAN node if the indication of the TAI for the TA in which the UE is located indicates that the TA in which the UE is located was not determined by the RAN node, e.g., as discussed in stage 11 of FIG. 9 and discussed in reference to option C+D. A means for including a registration area (RA) in the NAS accept, and including in the RA the TAI for the TA in which the UE is located if the TAI for the TA in which the UE is located is one of the TAIs broadcast in the satellite radio cell by the RAN node; including in the RA at least one of the TAIs broadcast in the satellite radio cell by the RAN node if the TAI for the TA in which the UE is located is not one of the TAIs broadcast in the satellite radio cell by the RAN node, and including in the RA at least one of the TAIs broadcast in the satellite radio cell by the RAN node if the indication of the TAI for the TA in which the UE is located indicates that the TA in which the UE is located was not determined by the RAN node may be, e.g., the external interface 1102, and one or more processors 1104 with dedicated hardware or implementing executable code or software instructions in memory 1116 and/or medium 1118, such as the NAS response module 1126, in core network node 1100 in FIG. 11.

FIG. 15 shows a flowchart of an example procedure 1500 for supporting satellite wireless access by a user equipment (e.g. a UE 105, UE 902, UE 1000) to a serving public land mobile network (PLMN), performed by the UE. Generally, the example procedure 1500 is applicable to Option C+D and rules 1 to 4 described previously.

As illustrated, at block 1502, the UE may receive a plurality of tracking area (TA) identities (TAIs) broadcast in a satellite radio cell by a Radio Access Network (RAN) node, e.g., as discussed in stage 2 of FIG. 9. A means for receiving a plurality of two or more tracking area (TA) identities (TAIs) broadcast in a satellite radio cell by a Radio Access Network (RAN) node may be, e.g., the wireless transceiver 1002 and one or more processors 1004 with dedicated hardware or implementing executable code or software instructions in memory 1016 and/or medium 1018, such as the TAI module 1021, in UE 1000 in FIG. 10.

At block 1504, the UE may determine whether access to the satellite radio cell is allowed based on the plurality of TAIs, e.g., as discussed in stage 2 of FIG. 9 and rule 1. A means for determining whether access to the satellite radio cell is allowed based on the plurality of TAIs may be, e.g., the one or more processors 1004 with dedicated hardware or implementing executable code or software instructions in memory 1016 and/or medium 1018, such as the TAI module 1021, in UE 1000 in FIG. 10.

At block 1506, the UE may send in the satellite radio cell a non-access stratum (NAS) request message to a core network node via the RAN node in response to a determination that access to the satellite radio cell is allowed, e.g., as discussed in stage 5 of FIG. 9. A means for sending a non-access stratum (NAS) request message in the satellite radio cell to a core network node via the RAN node in response to a determination that access to the satellite radio cell is allowed may be, e.g., the wireless transceiver 1002 and one or more processors 1004 with dedicated hardware or implementing executable code or software instructions in memory 1016 and/or medium 1018, such as the NAS request module 1022, in UE 1000 in FIG. 10.

At block 1508, the UE receives in the satellite radio cell a NAS response message from the core network node via the RAN node, e.g., as discussed at stages 9 or 11 of FIG. 9 and discussed in reference to rule 2. A means for receiving a NAS response message in the satellite radio cell from the core network node via the RAN node may be, e.g., the wireless transceiver 1002 and one or more processors 1004 with dedicated hardware or implementing executable code or software instructions in memory 1016 and/or medium 1018, such as the NAS response module 1024, in UE 1000 in FIG. 10.

In one implementation, the RAN node may be an NR NodeB (e.g. a gNB 106, 202 or 307) and the core network node may be an Access and Mobility Management Function (e.g. an AMF 122) or the RAN node may be an evolved NodeB (eNB) and the core network node may be a Mobility Management Entity (MME), e.g., as discussed in FIG. 9.

In one implementation, the UE may determine whether access to the satellite radio cell is allowed based on the plurality of TAIs by determining that access is unconditionally allowed if at least one of the plurality of TAIs is part of a current UE registration area (RA) or is part of an allowed TAI list for the UE, determining that access is conditionally allowed if access is not unconditionally allowed and if at least one of the plurality of TAIs is not part of a forbidden TAI list for the UE, and determining that access is not allowed if all of the plurality of TAIs are part of the forbidden TAI list for the UE, e.g., as discussed in stage 2 of FIG. 9 and discussed in reference to rules 1 and 2. The means for determining whether access to the satellite radio cell is allowed based on the plurality of TAIs may include a means for determining that access is unconditionally allowed if at least one of the plurality of TAIs is part of a current UE registration area (RA) or is part of an allowed TAI list for the UE, means for determining that access is conditionally allowed if access is not unconditionally allowed and if at least one of the plurality of TAIs is not part of a forbidden TAI list for the UE, and means for determining that access is not allowed if all of the plurality of TAIs are part of the forbidden TAI list for the UE may be, e.g., the one or more processors 1004 with dedicated hardware or implementing executable code or software instructions in memory 1016 and/or medium 1018, such as the TAI module 1021, in UE 1000 in FIG. 10.

In one implementation, the NAS request message may comprise any uplink NAS message if the access is determined to be unconditionally allowed, wherein the NAS request message may comprise a NAS Registration Request or NAS Attach Request if the access is determined to be conditionally allowed, e.g., as discussed in stage 11 of FIG. 9.

In one implementation, the NAS request message may comprise a NAS Registration Request and the NAS response message may comprise a NAS Registration Accept message or the NAS request message may comprise a NAS Attach Request and the NAS response message may comprise a NAS Attach Accept message, wherein the NAS accept message includes at least one of a registration area (RA) comprising a first list of TAIs and an allowed TAI list comprising a second list of TAIs, e.g., as discussed in stages 5 and 11 of FIG. 9 and discussed in reference to rules 1 and 2. The UE may then remove each TAI in the first list of TAIs or in the second list of TAIs or in both the first and second lists of TAIs from a list of forbidden TAIs for the UE if the each TAI is part of the forbidden list of TAIs, e.g., as discussed in stage 12 of FIG. 9 and discussed in reference to rule 4. A means for removing each TAI in the first list of TAIs or in the second list of TAIs or in both the first and second lists of TAIs from a list of forbidden TAIs for the UE if the each TAI is part of the forbidden list of TAIs may be, e.g., the and one or more processors 1004 with dedicated hardware or implementing executable code or software instructions in memory 1016 and/or medium 1018, such as the list update module 1026, in UE 1000 in FIG. 10.

In one implementation, the NAS request message may comprise a NAS Registration Request and the NAS response message may comprise a NAS Registration Reject message or the NAS request message may comprise a NAS Attach Request and the NAS response message may comprise a NAS Attach Reject message, wherein the NAS response message indicates a forbidden tracking area and includes a list of TAIs, e.g., as discussed in stages 5 and 9 of FIG. 9. The UE may then add each TAI in the list of TAIs to a list of forbidden TAIs for the UE, e.g., as discussed at stage 10 of FIG. 9. A means for adding each TAI in the list of TAIs to a list of forbidden TAIs for the UE may be, e.g., the and one or more processors 1004 with dedicated hardware or implementing executable code or software instructions in memory 1016 and/or medium 1018, such as the list update module 1026, in UE 1000 in FIG. 10.

In one implementation, the NAS request message may comprise a NAS Registration Request and the NAS response message may comprise a NAS Registration Reject message or the NAS request message may comprise a NAS Attach Request and the NAS response message may comprise a NAS Attach Reject message, wherein the NAS response message indicates a forbidden tracking area and does not include a TAI or a list of TAIs, e.g., as discussed in stages 5 and 9 of FIG. 9. The UE may then add each TAI in the plurality of TAIs to a list of forbidden TAIs for the UE, e.g., as discussed at stage 10 of FIG. 9 and discussed in reference to rule 3. A means for adding each TAI in the plurality of TAIs to a list of forbidden TAIs for the UE may be, e.g., the and one or more processors 1004 with dedicated hardware or implementing executable code or software instructions in memory 1016 and/or medium 1018, such as the list update module 1026, in UE 1000 in FIG. 10.

Abbreviations used herein may be identified in Table 1 as follows:

TABLE 1

| | |
|---|---|
| EM | Emergency |
| ES | Earth Station |
| GEO | Geostationary Earth Orbit |
| ISL | Inter-Satellite Links |
| LEO | Low Earth Orbit |
| LI | Lawful Interception |
| MEO | Medium Earth Orbit |
| MNO | Mobile Network Operator |
| NGEO | Non-Geo stationary Earth Orbiting |
| NTN | Non-Terrestrial Network |
| gNB | satellite Node B |
| SV | Space Vehicle |
| SVO | SV Operator |
| TA | Tracking Area |
| TAC | Tracking Area Code |
| TAI | Tracking Area Identity |
| WEA | Wireless Emergency Alerting |

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above is also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by Radio Access Network (RAN) node for supporting satellite wireless access of a user equipment (UE) to a serving public land mobile network (PLMN), the method comprising: broadcasting one or more tracking area (TA) identities (TAIs) in a satellite radio cell; receiving a non-access stratum (NAS) message from the UE, the NAS message sent by the UE in the satellite radio cell; determining a TA in which the UE is located; and sending the NAS message to a core network node and including with the NAS message a TAI for the TA in which the UE is located and the one or more TAIs broadcast in the satellite radio cell.

Clause 2. The method of clause 1, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 3. The method of any of clauses 1-2, wherein the one or more TAIs broadcast in the satellite radio cell comprises a single TAI.

Clause 4. The method of any of clauses 1-3, further comprising: failing to determine the TA in which the UE is located; and sending the NAS message to the core network node and including with the NAS message the one or more TAIs broadcast in the satellite radio cell and an indication that the TA in which the UE is located was not determined.

Clause 5. A Radio Access Network (RAN) node configured for supporting satellite wireless access of a user equipment (UE) to a serving public land mobile network (PLMN), comprising: an external interface configured to wirelessly communicate with network entities; at least one memory; and at least one processor coupled to the external interface, and the at least one memory, the at least one processor configured to: broadcast, via the external interface, one or more tracking area (TA) identities (TAIs) in a satellite radio cell; receive, via the external interface, a non-access stratum (NAS) message from the UE, the NAS message sent by the UE in the satellite radio cell; determine a TA in which the UE is located; and send, via the external interface, the NAS message to a core network node and including with the NAS message a TAI for the TA in which the UE is located and the one or more TAIs broadcast in the satellite radio cell.

Clause 6. The RAN node of clause 5, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 7. The RAN node of any of clauses 5-6, wherein the one or more TAIs broadcast in the satellite radio cell comprises a single TAI.

Clause 8. The RAN node of any of clauses 5-7, wherein the at least processor is further configured to: fail to determine the TA in which the UE is located; and send, via the external interface, the NAS message to the core network node and including with the NAS message the one or more TAIs broadcast in the satellite radio cell and an indication that the TA in which the UE is located was not determined.

Clause 9. A Radio Access Network (RAN) node configured for supporting satellite wireless access of a user equipment (UE) to a serving public land mobile network (PLMN), comprising: means for broadcasting one or more tracking area (TA) identities (TAIs) in a satellite radio cell; means for receiving a non-access stratum (NAS) message from the UE, the NAS message sent by the UE in the satellite radio cell; means for determining a TA in which the UE is located; and means for sending the NAS message to a core network node and including with the NAS message a TAI for the TA in which the UE is located and the one or more TAIs broadcast in the satellite radio cell.

Clause 10. The RAN node of clause 9, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 11. The RAN node of any of clauses 9-10, wherein the one or more TAIs broadcast in the satellite radio cell comprises a single TAI.

Clause 12. The RAN node of any of clauses 9-11, further comprising: means for failing to determine the TA in which the UE is located; and means for sending the NAS message to the core network node and including with the NAS message the one or more TAIs broadcast in the satellite radio cell and an indication that the TA in which the UE is located was not determined.

Clause 13. A non-transitory storage medium including program code stored thereon, the program code is operable to configure at least one processor in a Radio Access Network (RAN) node for supporting satellite wireless access of a user equipment (UE) to a serving public land mobile network (PLMN), the program code comprising instructions to: broadcast one or more tracking area (TA) identities (TAIs) in a satellite radio cell; receive a non-access stratum (NAS) message from the UE, the NAS message sent by the UE in the satellite radio cell; determine a TA in which the UE is located; and send the NAS message to a core network node and including with the NAS message a TAI for the TA in which the UE is located and the one or more TAIs broadcast in the satellite radio cell.

Clause 14. The non-transitory storage medium of clause 13, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 15. The non-transitory storage medium of any of clauses 13-14, wherein the one or more TAIs broadcast in the satellite radio cell comprises a single TAI.

Clause 16. The non-transitory storage medium of any of clauses 13-15, wherein the program code further comprises instructions to: fail to determine the TA in which the UE is located; and send the NAS message to the core network node and including with the NAS message the one or more TAIs broadcast in the satellite radio cell and an indication that the TA in which the UE is located was not determined.

Clause 17. A method performed by a core network node for supporting satellite wireless access by a user equipment (UE) to a serving public land mobile network (PLMN), the method comprising: receiving a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determining whether the UE is allowed to access the satellite radio cell based on the TAIs broadcast in the satellite radio cell by the RAN node; and sending a NAS accept message to the UE in response to a determination that the UE is allowed to access the satellite radio cell.

Clause 18. The method of clause 17, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 19. The method of any of clauses 17-18, wherein the one or more TAIs broadcast in the satellite radio cell comprises a single TAI.

Clause 20. The method of any of clauses 17-19, wherein the NAS request message comprises a NAS Registration Request and the NAS accept message comprises a NAS Registration Accept or the NAS request message comprises a NAS Attach Request and the NAS accept message comprises a NAS Attach Accept, further comprising: including a registration area (RA) in the NAS accept message; including in the RA the TAI for the TA in which the UE is located if the TAI for the TA in which the UE is located is one of the TAIs broadcast in the satellite radio cell by the RAN node; including in the RA at least one of the TAIs broadcast in the satellite radio cell by the RAN node if the TAI for the TA in which the UE is located is not one of the TAIs broadcast in the satellite radio cell by the RAN node; and including in the RA at least one of the TAIs broadcast in the satellite radio cell by the RAN node if the indication of the TAI for the TA in which the UE is located indicates that the TA in which the UE is located was not determined by the RAN node.

Clause 21. A core network node configured for supporting satellite wireless access by a user equipment (UE) to a serving public land mobile network (PLMN), comprising: an external interface configured to wirelessly communicate with network entities; at least one memory; and at least one processor coupled to the external interface, and the at least one memory, the at least one processor configured to: receive, via the external interface, a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determine whether the UE is allowed to access the satellite radio cell based on the TAIs broadcast in the satellite radio cell by the RAN node; and send, via the external interface, a NAS accept message to the UE in response to a determination that the UE is allowed to access the satellite radio cell.

Clause 22. The core network node of clause 21, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 23. The core network node of any of clauses 21-22, wherein the one or more TAIs broadcast in the satellite radio cell comprises a single TAI.

Clause 24. The core network node of any of clauses 21-23, wherein the NAS request message comprises a NAS Registration Request and the NAS accept message comprises a NAS Registration Accept or the NAS request message comprises a NAS Attach Request and the NAS accept message comprises a NAS Attach Accept, wherein the at least one processor further configured to: include a registration area (RA) in the NAS accept message; include in the RA the TAI for the TA in which the UE is located if the TAI for the TA in which the UE is located is one of the TAIs broadcast in the satellite radio cell by the RAN node; include in the RA at least one of the TAIs broadcast in the satellite radio cell by the RAN node if the TAI for the TA in which the UE is located is not one of the TAIs broadcast in the satellite radio cell by the RAN node; and include in the RA at least one of the TAIs broadcast in the satellite radio cell by the RAN node if the indication of the TAI for the TA in which the UE is located indicates that the TA in which the UE is located was not determined by the RAN node.

Clause 25. A core network node configured for supporting satellite wireless access by a user equipment (UE) to a serving public land mobile network (PLMN), comprising: means for receiving a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; means for determining whether the UE is allowed to access the satellite radio cell based on the TAIs broadcast in the satellite radio cell by the RAN node; and means for sending a NAS accept message to the UE in response to a determination that the UE is allowed to access the satellite radio cell.

Clause 26. The core network node of clause 25, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 27. The core network node of any of clauses 25-26, wherein the one or more TAIs broadcast in the satellite radio cell comprises a single TAI.

Clause 28. The core network node of any of clauses 25-27, wherein the NAS request message comprises a NAS Registration Request and the NAS accept message comprises a NAS Registration Accept or the NAS request message comprises a NAS Attach Request and the NAS accept message comprises a NAS Attach Accept, further comprising: means for including a registration area (RA) in the NAS accept message; means for including in the RA the TAI for the TA in which the UE is located if the TAI for the TA in which the UE is located is one of the TAIs broadcast in the satellite radio cell by the RAN node; means for including in the RA at least one of the TAIs broadcast in the satellite radio cell by the RAN node if the TAI for the TA in which the UE is located is not one of the TAIs broadcast in the satellite radio cell by the RAN node; and means for including in the RA at least one of the TAIs broadcast in the satellite radio cell by the RAN node if the indication of the TAI for the TA in which the UE is located indicates that the TA in which the UE is located was not determined by the RAN node.

Clause 29. A non-transitory storage medium including program code stored thereon, the program code is operable to configure at least one processor in a core network node for supporting satellite wireless access by a user equipment (UE) to a serving public land mobile network (PLMN), the program code comprising instructions to: receive a non-access stratum (NAS) request message and one or more tracking area (TA) identities (TAIs) from a Radio Access Network (RAN) node, the NAS request message sent by the UE to the RAN node in a satellite radio cell, the one or more TAIs comprising TAIs broadcast in the satellite radio cell by the RAN node and an indication of a TAI for a TA in which the UE is located; determine whether the UE is allowed to access the satellite radio cell based on the TAIs broadcast in the satellite radio cell by the RAN node; and send a NAS accept message to the UE in response to a determination that the UE is allowed to access the satellite radio cell.

Clause 30. The non-transitory storage medium of clause 29, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 31. The non-transitory storage medium of any of clauses 29-30, wherein the one or more TAIs broadcast in the satellite radio cell comprises a single TAI.

Clause 32. The non-transitory storage medium of any of clauses 29-31, wherein the NAS request message comprises a NAS Registration Request and the NAS accept message comprises a NAS Registration Accept or the NAS request message comprises a NAS Attach Request and the NAS accept message comprises a NAS Attach Accept, the program code further comprising instructions to: include a registration area (RA) in the NAS accept message; include in the RA the TAI for the TA in which the UE is located if the TAI for the TA in which the UE is located is one of the TAIs broadcast in the satellite radio cell by the RAN node; include in the RA at least one of the TAIs broadcast in the satellite radio cell by the RAN node if the TAI for the TA in which the UE is located is not one of the TAIs broadcast in the satellite radio cell by the RAN node; and include in the RA at least one of the TAIs broadcast in the satellite radio cell by the RAN node if the indication of the TAI for the TA in which the UE is located indicates that the TA in which the UE is located was not determined by the RAN node.

Clause 33. A method performed by a user equipment (UE) for supporting satellite wireless access to a serving public land mobile network (PLMN), the method comprising: receiving a plurality of tracking area (TA) identities (TAIs) broadcast in a satellite radio cell by a Radio Access Network (RAN) node; determining whether access to the satellite radio cell is allowed based on the plurality of TAIs; sending in the satellite radio cell a non-access stratum (NAS) request message to a core network node via the RAN node in response to a determination that access to the satellite radio cell is allowed; and receiving in the satellite radio cell a NAS response message from the core network node via the RAN node.

Clause 34. The method of clause 33, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 35. The method of any of clauses 33-34, wherein determining whether access to the satellite radio cell is allowed based on the plurality of TAIs comprises: determining that access is unconditionally allowed if at least one of the plurality of TAIs is part of a current UE registration area (RA) or is part of an allowed TAI list for the UE; determining that access is conditionally allowed if access is not unconditionally allowed and if at least one of the plurality of TAIs is not part of a forbidden TAI list for the UE; and determining that access is not allowed if all of the plurality of TAIs are part of the forbidden TAI list for the UE.

Clause 36. The method of any of clauses 33-35, wherein the NAS request message may comprise any uplink NAS message if the access is determined to be unconditionally allowed, wherein the NAS request message may comprise a NAS Registration Request or NAS Attach Request if the access is determined to be conditionally allowed.

Clause 37. The method of any of clauses 33-36, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, the method further comprising: removing each TAI in the first list of TAIs or in the second list of TAIs or in both the first and second lists of TAIs from a list of forbidden TAIs for the UE if the each TAI is part of the forbidden list of TAIs.

Clause 38. The method of any of clauses 33-37, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, the method further comprising: adding each TAI in the list of TAIs to a list of forbidden TAIs for the UE.

Clause 39. The method of any of clauses 33-38, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, the method further comprising: adding each TAI in the plurality of TAIs to a list of forbidden TAIs for the UE.

Clause 40. A user equipment (UE) configured for supporting satellite wireless access to a serving public land mobile network (PLMN), comprising: a wireless transceiver configured to wirelessly communicate with network entities; at least one memory; and at least one processor coupled to the wireless transceiver, and the at least one memory, the at least one processor configured to: receive, via the wireless transceiver, a plurality of tracking area (TA) identities (TAIs) broadcast in a satellite radio cell by a Radio Access Network (RAN) node; determine, via the wireless transceiver, whether access to the satellite radio cell is allowed based on the plurality of TAIs; send, via the wireless transceiver, a non-access stratum (NAS) request message in the satellite radio cell to a core network node via the RAN node in response to a determination that access to the satellite radio cell is allowed; and receive, via the wireless transceiver, a NAS response message in the satellite radio cell from the core network node via the RAN node.

Clause 41. The UE of clause 40, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 42. The UE of any of clauses 40-41, wherein determine whether access to the satellite radio cell is allowed based on the plurality of TAIs comprises: determine that access is unconditionally allowed if at least one of the plurality of TAIs is part of a current UE registration area (RA) or is part of an allowed TAI list for the UE; determine that access is conditionally allowed if access is not unconditionally allowed and if at least one of the plurality of TAIs is not part of a forbidden TAI list for the UE; and determine that access is not allowed if all of the plurality of TAIs are part of the forbidden TAI list for the UE.

Clause 43. The UE of any of clauses 40-42, wherein the NAS request message may comprise any uplink NAS message if the access is determined to be unconditionally allowed, wherein the NAS request message may comprise a NAS Registration Request or NAS Attach Request if the access is determined to be conditionally allowed.

Clause 44. The UE of any of clauses 40-43, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, wherein the at least one processor is further configured to: remove each TAI in the first list of TAIs or in the second list of TAIs or in both the first and second lists of TAIs from a list of forbidden TAIs for the UE if the each TAI is part of the forbidden list of TAIs.

Clause 45. The UE of any of clauses 40-44, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, wherein the at least one processor is further configured to: add each TAI in the list of TAIs to a list of forbidden TAIs for the UE.

Clause 46. The UE of any of clauses 40-45, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, wherein the at least one processor is further configured to: add each TAI in the plurality of TAIs to a list of forbidden TAIs for the UE.

Clause 47. A user equipment (UE) configured for supporting satellite wireless access to a serving public land mobile network (PLMN), comprising: means for receiving a plurality of tracking area (TA) identities (TAIs) broadcast in a satellite radio cell by a Radio Access Network (RAN) node; means for determining whether access to the satellite radio cell is allowed based on the plurality of TAIs; means for sending a non-access stratum (NAS) request message in the satellite radio cell to a core network node via the RAN node in response to a determination that access to the satellite radio cell is allowed; and means for receiving a NAS response message in the satellite radio cell from the core network node via the RAN node.

Clause 48. The UE of clause 47, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 49. The UE of any of clauses 47-48, wherein the means for determining whether access to the satellite radio cell is allowed based on the plurality of TAIs comprises: means for determining that access is unconditionally allowed if at least one of the plurality of TAIs is part of a current UE registration area (RA) or is part of an allowed TAI list for the UE; means for determining that access is conditionally allowed if access is not unconditionally allowed and if at least one of the plurality of TAIs is not part of a forbidden TAI list for the UE; and means for determining that access is not allowed if all of the plurality of TAIs are part of the forbidden TAI list for the UE.

Clause 50. The UE of any of clauses 47-49, wherein the NAS request message may comprise any uplink NAS message if the access is determined to be unconditionally allowed, wherein the NAS request message may comprise a NAS Registration Request or NAS Attach Request if the access is determined to be conditionally allowed.

Clause 51. The UE of any of clauses 47-50, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, further comprising: means for removing each TAI in the first list of TAIs or in the second list of TAIs or in both the first and second lists of TAIs from a list of forbidden TAIs for the UE if the each TAI is part of the forbidden list of TAIs.

Clause 52. The UE of any of clauses 47-51, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, further comprising: means for adding each TAI in the list of TAIs to a list of forbidden TAIs for the UE.

Clause 53. The UE of any of clauses 47-52, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, further comprising: means for adding each TAI in the plurality of TAIs to a list of forbidden TAIs for the UE.

Clause 54. A non-transitory storage medium including program code stored thereon, the program code is operable to configure at least one processor in a user equipment (UE) for supporting satellite wireless access to a serving public land mobile network (PLMN), the program comprising instructions to: receive a plurality of tracking area (TA) identities (TAIs) broadcast in a satellite radio cell by a Radio Access Network (RAN) node; determine whether access to the satellite radio cell is allowed based on the plurality of TAIs; send a non-access stratum (NAS) request message in the satellite radio cell to a core network node via the RAN node in response to a determination that access to the satellite radio cell is allowed; and receive a NAS response message in the satellite radio cell from the core network node via the RAN node.

Clause 55. The non-transitory storage medium of clause 54, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

Clause 56. The non-transitory storage medium of any of clauses 54-55, wherein the instructions to determine whether access to the satellite radio cell is allowed based on the plurality of TAIs comprises instructions to: determine that access is unconditionally allowed if at least one of the plurality of TAIs is part of a current UE registration area (RA) or is part of an allowed TAI list for the UE; determine that access is conditionally allowed if access is not unconditionally allowed and if at least one of the plurality of TAIs is not part of a forbidden TAI list for the UE; and determine that access is not allowed if all of the plurality of TAIs are part of the forbidden TAI list for the UE.

Clause 57. The non-transitory storage medium of any of clauses 54-56, wherein the NAS request message may comprise any uplink NAS message if the access is determined to be unconditionally allowed, wherein the NAS request message may comprise a NAS Registration Request or NAS Attach Request if the access is determined to be conditionally allowed.

Clause 58. The non-transitory storage medium of any of clauses 54-57, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, wherein the program code further comprises instructions to: remove each TAI in the first list of TAIs or in the second list of TAIs or in both the first and second lists of TAIs from a list of forbidden TAIs for the UE if the each TAI is part of the forbidden list of TAIs.

Clause 59. The non-transitory storage medium of any of clauses 54-58, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, wherein the program code further comprises instructions to: add each TAI in the list of TAIs to a list of forbidden TAIs for the UE.

Clause 60. The non-transitory storage medium of any of clauses 54-59, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, wherein the program code further comprises instructions to: add each TAI in the plurality of TAIs to a list of forbidden TAIs for the UE.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by Radio Access Network (RAN) node for supporting satellite wireless access of a user equipment (UE) to a serving public land mobile network (PLMN), the method comprising:
   broadcasting one or more tracking area (TA) identities (TAIs) in a satellite radio cell;
   receiving a non-access stratum (NAS) message from the UE, the NAS message sent by the UE in the satellite radio cell;
   determining a TA in which the UE is located; and
   sending the NAS message to a core network node, wherein the NAS message includes a TAI for the TA in which the UE is located and additionally includes the one or more TAIs broadcast in the satellite radio cell.

2. The method of claim 1, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

3. The method of claim 1, wherein the one or more TAIs broadcast in the satellite radio cell comprises a single TAI.

4. The method of claim 1, further comprising:
   failing to determine the TA in which the UE is located; and
   sending the NAS message to the core network node and including with the NAS message the one or more TAIs broadcast in the satellite radio cell and an indication that the TA in which the UE is located was not determined.

5. A Radio Access Network (RAN) node configured for supporting satellite wireless access of a user equipment (UE) to a serving public land mobile network (PLMN), comprising:
an external interface configured to wirelessly communicate with network entities;
at least one memory; and
at least one processor coupled to the external interface, and the at least one memory, the at least one processor configured to:
broadcast, via the external interface, one or more tracking area (TA) identities (TAIs) in a satellite radio cell;
receive, via the external interface, a non-access stratum (NAS) message from the UE, the NAS message sent by the UE in the satellite radio cell;
determine a TA in which the UE is located; and
send, via the external interface, the NAS message to a core network node, wherein the NAS message includes a TAI for the TA in which the UE is located and additionally includes the one or more TAIs broadcast in the satellite radio cell.

6. The RAN node of claim 5, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

7. The RAN node of claim 5, wherein the one or more TAIs broadcast in the satellite radio cell comprises a single TAI.

8. The RAN node of claim 5, wherein the at least processor is further configured to:
fail to determine the TA in which the UE is located; and
send, via the external interface, the NAS message to the core network node and including with the NAS message the one or more TAIs broadcast in the satellite radio cell and an indication that the TA in which the UE is located was not determined.

9. A method performed by a user equipment (UE) for supporting satellite wireless access to a serving public land mobile network (PLMN), the method comprising:
receiving a plurality of tracking area (TA) identities (TAIs) broadcast in a satellite radio cell by a Radio Access Network (RAN) node;
determining whether access to the satellite radio cell is allowed based on a comparison of the plurality of TAIs with a current UE registration area (RA) or allowed TAI list for the UE;
sending in the satellite radio cell a non-access stratum (NAS) request message to a core network node via the RAN node in response to a determination that access to the satellite radio cell is allowed; and
receiving in the satellite radio cell a NAS response message from the core network node via the RAN node.

10. The method of claim 9, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

11. The method of claim 9, wherein the comparison of the plurality of TAIs with the current UE RA or allowed TAI list for the UE comprises:
determining that access is unconditionally allowed if at least one of the plurality of TAIs is part of a current UE registration area (RA) or is part of an allowed TAI list for the UE;
determining that access is conditionally allowed if access is not unconditionally allowed and if at least one of the plurality of TAIs is not part of a forbidden TAI list for the UE; and
determining that access is not allowed if all of the plurality of TAIs are part of the forbidden TAI list for the UE.

12. The method of claim 9, wherein the NAS request message may comprise any uplink NAS message if the access is determined to be unconditionally allowed, wherein the NAS request message may comprise a NAS Registration Request or NAS Attach Request if the access is determined to be conditionally allowed.

13. The method of claim 9, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, the method further comprising:
removing each TAI in the first list of TAIs or in the second list of TAIs or in both the first and second lists of TAIs from a list of forbidden TAIs for the UE if the each TAI is part of the forbidden list of TAIs.

14. The method of claim 9, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, the method further comprising:
adding each TAI in the list of TAIs to a list of forbidden TAIs for the UE.

15. The method of claim 9, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, the method further comprising:
adding each TAI in the plurality of TAIs to a list of forbidden TAIs for the UE.

16. A user equipment (UE) configured for supporting satellite wireless access to a serving public land mobile network (PLMN), comprising:
a wireless transceiver configured to wirelessly communicate with network entities;
at least one memory; and
at least one processor coupled to the wireless transceiver, and the at least one memory, the at least one processor configured to:
receive, via the wireless transceiver, a plurality of tracking area (TA) identities (TAIs) broadcast in a satellite radio cell by a Radio Access Network (RAN) node;
determine, via the wireless transceiver, whether access to the satellite radio cell is allowed based on a comparison of the plurality of TAIs with a current UE registration area (RA) or allowed TAI list for the UE;

send, via the wireless transceiver, a non-access stratum (NAS) request message in the satellite radio cell to a core network node via the RAN node in response to a determination that access to the satellite radio cell is allowed; and receive, via the wireless transceiver, a NAS response message in the satellite radio cell from the core network node via the RAN node.

17. The UE of claim 16, wherein the RAN node comprises an NR NodeB (gNB) and the core network node comprises an Access and Mobility Management Function (AMF) or the RAN node comprises an evolved NodeB (eNB) and the core network node comprises a Mobility Management Entity (MME).

18. The UE of claim 16, wherein, to perform the comparison of the plurality of TAIs with the current UE RA or allowed TAI list for the UE, the at least one processor is configured to:

determine that access is unconditionally allowed if at least one of the pluralities of TAIs is part of a current UE registration area (RA) or is part of an allowed TAI list for the UE;

determine that access is conditionally allowed if access is not unconditionally allowed and if at least one of the plurality of TAIs is not part of a forbidden TAI list for the UE; and determine that access is not allowed if all of the plurality of TAIs are part of the forbidden TAI list for the UE.

19. The UE of claim 16, wherein the NAS request message may comprise any uplink NAS message if the access is determined to be unconditionally allowed, wherein the NAS request message may comprise a NAS Registration Request or NAS Attach Request if the access is determined to be conditionally allowed.

20. The UE of claim 16, wherein the NAS request message comprises a NAS Registration Request and the NAS response message comprises a NAS Registration Accept message or the NAS request message comprises a NAS Attach Request and the NAS response message comprises a NAS Attach Accept message, wherein the NAS accept message includes at least one of a registration area (RA) comprising a first list of TAIs and an allowed TAI list comprising a second list of TAIs, wherein the at least one processor is further configured to:

remove each TAI in the first list of TAIs or in the second list of TAIs or in both the first and second lists of TAIs from a list of forbidden TAIs for the UE if the each TAI is part of the forbidden list of TAIs.

21. The UE of claim 16, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and includes a list of TAIs, wherein the at least one processor is further configured to:

add each TAI in the list of TAIs to a list of forbidden TAIs for the UE.

22. The UE of claim 16, wherein the NAS request message comprises a NAS Registration Request and the NAS response message comprises a NAS Registration Reject message or the NAS request message comprises a NAS Attach Request and the NAS response message comprises a NAS Attach Reject message, wherein the NAS response message indicates a forbidden tracking area and does not include a TAI or a list of TAIs, wherein the at least one processor is further configured to:

add each TAI in the plurality of TAIs to a list of forbidden TAIs for the UE.

* * * * *